United States Patent [19]
Murata et al.

[11] Patent Number: 5,925,146
[45] Date of Patent: Jul. 20, 1999

[54] RECEPTION DATA EXPANDER HAVING NOISE REDUCED IN GENERATION OF RECEPTION DATA ERROR

[75] Inventors: Kenji Murata; Koji Goto, both of Hyogo, Japan

[73] Assignee: Mitsubishi Denki Kabushiki Kaisha, Tokyo, Japan

[21] Appl. No.: 08/924,503

[22] Filed: Sep. 5, 1997

[30] Foreign Application Priority Data

Jan. 24, 1997 [JP] Japan .................................. 9-011205

[51] Int. Cl.⁶ ..................................................... G06F 11/00
[52] U.S. Cl. ........................................... 714/746; 714/708
[58] Field of Search ................................ 371/30; 375/99

[56] References Cited

U.S. PATENT DOCUMENTS 4,276,649  6/1981  Groenendaal et al. .................... 371/55
5,309,443  5/1994  Schorman ................................ 371/5.5

FOREIGN PATENT DOCUMENTS 5-347594  12/1993  Japan .
WO 96/22637  7/1996  WIPO .

OTHER PUBLICATIONS

Nakamura et al., "Improved ADPCM Voice Transmission for TDMA–TDD Systems", 1993 43rd IEEE Vehicular Technology Conference, Secaucus, NJ, May 18–20 1993, pp. 301–304.

*Primary Examiner*—Albert DeCady
*Assistant Examiner*—Shelly A Chase
*Attorney, Agent, or Firm*—McDermott, Will & Emery

[57] ABSTRACT

A reception data expander includes: an adaptive differential pulse code modulation (ADPCM) decoder activated when error detection information attains a reception data error nondetected state for expanding an input ADPCM code into a PCM (pulse code modulation) code, and inhibited of its decoding process operation when the error detection information indicates an error detected state; a memory circuit set to a write state when the error detection information attains an error nondetected state for sequentially storing generated ADPCM code, and outputting a stored PCM code when the error detection information is rendered to an error detected state; and a reconstructed output switch for selecting and providing to the next PCM decoder a PCM code when the error detection information attains an error nondetected state, and a PCM code read out from the memory circuit when the error detection information attains an error detected state. Noise generation arising from discontinuity of an ADPCM code at the time of reception data generation can be suppressed effectively without increasing the device complexity and power consumption.

12 Claims, 19 Drawing Sheets

INITIAL VALUE : 34816

INITIAL VALUE : 544

5,925,146

1

RECEPTION DATA EXPANDER HAVING NOISE REDUCED IN GENERATION OF RECEPTION DATA ERROR

BACKGROUND OF THE INVENTION

1. Field of the Invention

The present invention relates to a device for expanding reception compression coded data, and particularly to a device for converting ADPCM (Adaptive Differential Pulse Code Modulation) coded data into PCM coded data. More particularly, the present invention relates to a structure for suppressing noise in transmission error generation in a voice decoder used in an ADPCM voice coding system.

2. Description of the Background Art

In communication terminals employed in a telephone system (PHS: personal handy phone system) and digital European cordless telephone systems (DECT), voice signals are compression-coded at high efficiency for transmission and the coded voice data is decoded at the receiver side, in order to reduce the amount of transmission data.

FIG. 36 schematically shows a structure of a conventional PHS portable telephone. Referring to FIG. 36, a portable telephone set includes an ADPCM system voice codec 1, and a transmission/reception unit 2 for transmitting and receiving an ADPCM code to and from ADPCM system voice codec 1.

ADPCM system voice codec 1 includes a PCM encoder 1a for receiving an analog voice signal provided via a microphone MC and converting the same into a PCM (Pulse Code Modulation) code, an ADPCM encoder 1b for compressing a PCM code from PCM encoder 1a into an ADPCM (Adaptive Differential Pulse Code Modulation) code for transmission to transmission/reception unit 2, an ADPCM decoder 1c for performing an expansion process on an ADPCM code from transmission/reception unit 2 to generate a PCM code, and a PCM decoder 1d for converting a PCM code from ADPCM decoder 1c into an analog voice signal and providing the analog voice signal to a speaker SP.

Transmission/reception unit 2 transfers data in the form of a packet in transmitting and receiving ADPCM coded data (referred simply as ADPCM code hereinafter). Transmission/reception unit 2 transmits a transmission packet and receives a reception packet in a time-divisional manner. At the time of transmission, the transmission packet is modulated by a carrier wave of a predetermined frequency for transmission. In reception, transmission/reception unit 2 removes the carrier wave from the received packet 2 to generate an ADPCM code packet.

FIG. 37 schematically shows the format of a packet used in this data communication. Referring to FIG. 37, a transmission/reception packet 50 includes a frame synchronization region 50a for storing a frame synchronization pattern having a predetermined bit pattern and indicating the beginning of the packet, a communication data region 50b for storing communication data (transmission data or reception data), and an error detection bit region 50c for storing an error detection code for detecting communication data error.

Conversion into such a packet is carried out in transmission/reception unit 2 of FIG. 36. In the transmission mode, an error detection code is generated by performing a predetermined process (for example, a process applying a generating matrix) on communication data in communication data region 50b. Frame 50 includes an amount of data having a time width of approximately 5 ms–10 ms. Time-

2 division-multiplexing of transmission and reception is carried out in the unit of this frame.

In this wireless communication, the probability of erroneous reception data being generated is higher than that of a communication system using a wire communication path due to a fading phenomenon or the like. Furthermore, the influence of data error at the receiver side is great since transmission data is compressed using high efficiency coding technique such as the ADPCM coding process. A function for suppressing noise arising from such data error becomes important.

An error detection circuit 60 is provided at the receiver side to suppress such data error, as shown in FIG. 38. Error detection circuit 60 detects whether there is an error in the communication data according to a checking matrix using the communication data and the error detection code in the reception packet. When the detected error can be corrected, the error is corrected and an ADPCM code is generated to be provided to an ADPCM decoder 1c shown in FIG. 36. CRC (Cyclic Redundancy Check) bits are used as the error detection code. In general, the detected error cannot be corrected using this error detection code. Therefore, when the presence of an error is detected by error detection circuit 60, error detection circuit 60 sets the error detection information to an error detection designating state. An error concealment process such as an frame interpolation process according to the error detection designating state of the error detection information is carried out.

FIG. 39 schematically shows the structure of the component for suppressing a noise upon transmission error generation in a conventional portable terminal. Referring to FIG. 39, a noise suppression unit includes a frame buffer 1ca for storing an ADPCM code 101 provided from a data input node 101a in the frame unit, and a decoder input switch 1cb for selecting one of an ADPCM code 103 read out from frame buffer 1ca and an ADPCM code 101 from input node 101a according to error detection information 102 from input node 102a and providing the selected code to an ADPCM decoder 1c as an ADPCM code 104 to be decoded. A PCM code 105 expanded and generated by ADPCM decoder 1c is provided to PCM decoder 1d shown in FIG. 36 via an output node 105a.

When error detection signal 102 indicates an error non-detected state, frame buffer 1ca stores the received ADPCM code from input node 101a in the unit of a frame. When error detection information 102 is set to an error detected state, frame buffer 1ca is inhibited of writing, and is set to a read out state. The stored ADPCM code is sequentially output. When error detection signal 102 indicates an error nondetected state, decoder input switch 1cb selects and provides to ADPCM decoder 1c ADPCM code 101 supplied from input node 101a. When error detection information 102 is set at an error detected state, decoder input switch 1cb selects and provides to ADPCM decoder 1c ADPCM code 103 read out from frame buffer Ica.

FIG. 40 shows the operational sequence of the noise suppression unit of FIG. 39. The operation of the noise suppression unit of FIG. 39 will be described with reference to FIG. 40.

When error detection information 102 attains an error nondetected state, frame buffer 1ca is set to a write state. ADPCM code 101 provided via input node 101a is sequentially stored in the units of frames n–3, n–2, and n–1.

When error detection information 102 attains an error nondetected state, decoder input switch 1cb selects and provides to ADPCM decoder 1c ADPCM code 101.

ADPCM decoder 1c sequentially decodes the ADPCM code in frames n-3, n-2 and n-1 to generate PCM code 105.

When an ADPCM code of the next frame n is applied to input node 101a, error detection information 102 is set to an error detected state if there is reception data error in frame n. In this state, frame buffer 1ca has writing thereinto inhibited, and set to a read out state. Decoder input switch 1cb is set to a state for selecting ADPCM code 103 from frame buffer 1ca. The ADPCM code of frame n-1 which is the preceding frame of the error-detected frame n is stored in frame buffer 1ca. The ADPCM code of frame n-1 is sequentially read out and provided to ADPCM decoder ic. Therefore, when an error is detected in frame n, PCM code 105 is generated according to an ADPCM code of a preceding frame n-1.

When there is no error in the next frame n+1, error detection information 102 is set to an error nondetected state. Under this condition, frame buffer 1c is set to a write state again to sequentially store the newly applied ADPCM code 101 of frame n+1. Decoder input switch 1cb selects ADPCM code 101 provided from input node 101a in this state. ADPCM decoder 1c sequentially performs an expansion process on ADPCM code in frame n+1 to generate PCM code 105.

As shown in FIG. 40, the frame in which an error is generated is replaced with the previous proper frame. The possibility of the wave form of the voice signals in two continuous frames being similar is high when the frame length is approximately 5 ms–10 ms. Noise generation is suppressed by substituting the frame in which an error is generated with the previous frame to carry out decoding with the ADPCM coded data (referred to simply as ADPCM code hereinafter) of the immediately preceding frame when transmission error occurs.

In the above-described conventional method of suppressing noise in transmission error occurrence, a frame buffer of a large storage capacity to store the ADPCM code of 1 frame is required. There is a problem that the number of components is increased, resulting in increased circuit complexity and power consumption. The usage of a frame buffer of a large storage capacity becomes a great bottleneck in the application of a mobile communication terminal where small size and low power consumption are required.

An ADPCM code is a coded version of a differential signal as will be described later. When substitution with an ADPCM code of a preceding frame is carried out in error occurrence, the following problems are encountered.

FIG. 41 schematically shows a structure of an ADPCM encoder for producing an ADPCM code to be transmitted. Referring to FIG. 41, an ADPCM encoder 1b includes a subtractor 23 for obtaining the difference between PCM code 120 provided from a PCM encoder via a node 120a and a prediction signal 122 to generate a differential signal 123, an adaptive quantizer 20 for carrying out an adaptive quantization process on differential signal 123 to generate and provide to a transmission path 121a an ADPCM code 121, an inverse adaptive quantizer 22 for performing an inverse adaptive quantization process on ADPCM code 121 from adaptive quantizer 20 to generate a quantized differential signal 124, an adder 24 for adding prediction signal 122 and quantized differential signal 124 to generate a reconstructed signal 125, and an adaptive predictor 21 receiving quantized differential signal 124 and reconstructed signal 125 to carry out adaptive prediction for generating prediction signal 122.

The ADPCM coding is an adaptive quantization of the differential signal between a prediction signal generated according to adaptive prediction and a PCM code. The internal state (coefficients described afterwards) is adaptively modified to carry out this adaptive process.

FIG. 42 schematically shows a structure of ADPCM decoder 1c of FIG. 39. Referring to FIG. 42, ADPCM decoder 1c includes an inverse adaptive quantizer 25 for performing an inverse adaptive quantization process on ADPCM code 101 provided via input node 101a to generate a quantized differential signal 127, an adder 27 for adding quantized differential signal 127 and prediction signal 126 to generate and transmit to a node 105a a PCM code 105, and an adaptive predictor 26 for carrying out adaptive prediction according to PCM code 105 from adder 27 and quantized differential signal 127 from inverse adaptive quantizer 25 to generate and provide to adder 27 a prediction signal 126. In ADPCM decoder ic, adaptive prediction is carried out according to PCM code 105 and quantized differential signal 127 to generate prediction signal 126.

As shown in FIGS. 41 and 42, the internal feedback loop of ADPCM encoder 1b, i.e. the feedback loop formed of inverse adaptive quantizer 22, adder 24, and adaptive predictor 21 has a structure similar to the internal structure of ADPCM decoder 1c. At the transmission and reception sides, the ADPCM encoder and ADPCM decoder operate with the internal states (coefficients for adaptive prediction) of respective inverse adaptive quantizers and adaptive predictors completely matching each other. Therefore, the internal state of inverse adaptive quantizer 22 and adaptive predictor 21 in the ADPCM encoder of the transmitting side is identical to the internal state of inverse adaptive quantizer 25 and adaptive predictor 26 in ADPCM decoder 1c of the receiving side. Therefore, PCM code 120 applied to ADPCM encoder 1b is identical to PCM code 105 output from ADPCM decoder 1c to allow proper reconstruction of a voice signal.

When the data (ADPCM code) of the frame in which error is generated is substituted with the proper data of the preceding frame to carry out coding when transmission error occurs, the following problems are encountered.

Referring to FIG. 43, the connection path of the reconstructed output switch is respectively altered at time t1 and time t2 when error occurs. The data loses its continuity at time t1 and time t2, which is equivalent to generation of data error right after reconstructed output switch 1cb is switched. More specifically, at the transition from an error nondetected state to an error detected state, the decoded ADPCM code is altered from the last ADPCM code #N of frame n-1 to the first ADPCM code #1 of frame n-1. At the transition from an error detected state to an error nondetected state, the last ADPCM code #N of frame n-1 is decoded, and then the first ADPCM code #1 of the new frame n+1 is decoded.

When the frame length is approximately 5 ms–10 ms, there is a high probability that the voice signals between two continuous frames have approximating wave forms to each other. Therefore, the internal parameter of the ADPCM decoder takes an approximating value in these two continuous frames. Also, there is deviation in the distribution of the probability that can be taken by each ADPCM code. This means that the probability of a code of a differential value having a high possibility of noise generation (a code with a great difference from the prediction signal) being connected at a discontinuous point is low. It is therefore possible to suppress the effect of this discontinuous data.

When a frame detected as having an error occurs once, reconstructed output switch 1cb is switched 2 times, i.e. at time t1 and time t2. This means that there are two discontinuous points in the data sequence, which is equivalent to that data error occurs 2 times. When error detection information indicates a state where an error is detected continuously for at least 2 frames, and when frame buffer 1c having a storage capacity of 1 frame is repeatedly used, the first ADPCM code and the last ADPCM code of the frame just before error occurrence will be decoded continuously in the frame change. The number of discontinuous points of data generated between adjacent frames increases in proportion to the number of frames having the error detection information set to an error detected state. This means that the effect of noise suppression is degraded.

In order to prevent increase of these data discontinuous points, the storage capacity of the frame buffer must be increased up to a size corresponding to the number of continuous frames each having an error detected state. This becomes a bottleneck in reducing the scale of the device.

SUMMARY OF THE INVENTION

An object of the present invention is to provide a reception data expander device that can have power consumption reduced without increasing the device complexity, and that can suppress noise effectively in reception data error occurrence.

Another object of the present invention is to provide a reception data expander device that can effectively suppress noise in transmission error occurrence in a portable terminal that uses an ADPCM codec.

A reception data expander device according to a first aspect of the present invention includes an input node for receiving and applying error detection information indicating whether there is an error in reception compression coded data provided in frame unit via a transmission path, a decoder activated in response to an error nondetected designation of the error detection information from the input node for performing an expansion process on the received compression coded data to generate expanded coded data, a memory circuit set to a write state in response to an error nondetected designation of the error detection information for storing expanded coded data from the decoder, and set to a read out state in response to an error detected designation of the error detection information to output the stored expanded coded data, and a reconstructed output switch receiving expanded coded data read out from the memory circuit and the expanded coded data from the decoder for selecting and outputting the expanded coded data from the decoder in response to an error nondetected designation of the error detection signal, and selecting and outputting the expanded coded data read out from the memory circuit in response to an error detected designation of the error detection information.

A reception data expander device according to another aspect of the present invention includes an input node for receiving error detection information indicating whether there is an error in compression coded data provided in frame unit via a transmission path, a decoder activated in response to an error nondetected designation of the error detection information for performing an expansion process on the compressed coded data applied via the transmission path to generate an expanded coded data, a background noise generator for generating background noise, and a reconstructed output switch receiving background noise from the background noise generator and expanded coded data from the decoder for selecting and outputting the background noise in response to an error detected designation of the error detection information, and selecting and outputting the expanded coded data from the decoder in response to an error nondetected designation of the error detection information.

A reception data expander device according to a further aspect of the present invention includes a node for receiving error detection information indicating whether there is an error in ADPCM coded data in each frame in frame unit for the ADPCM coded data transmitted in frame unit via a transmission path, an ADPCM decoder activated in response to error nondetection of the error detection information for performing an expansion process on the ADPCM code applied via the transmission path to generate an ADPCM coded data, a noise suppression data generator for generating noise suppression data to suppress noise generated in reconstructing output data of the ADPCM decoder at the time of transition of the state of the error detection information from the input node, and a reconstructed output switch for selecting and outputting data from the ADPCM decoder in response to an error nondetected designation of the error detection signal, and for selecting and outputting the noise suppression data from the noise suppression data generator according to an error detected designation of the error detection information.

When error occurrence in the received data is indicated or designated by the error detection information, the decoding process of the decoder is inhibited. The reconstructed output switch selects and provides the expanded coded data read out from the memory circuit. When the error detection information indicates an error detected state, the memory circuit is set to a read state (data read out state), and data writing thereinto is inhibited. The expanded coded data stored in the memory circuit is the expanded coded data output from the decoder just before the transition from the error nondetected state to the error detected state of the error detection information to be output as a direct current (DC) signal. When the frame has a time width of 5 ms–10 ms, a mute period of 5 ms–10 ms is inserted during reconstruction of the voice signal by this DC signal. However, the audio quality is degraded only to a level where a slight disconnection is perceived.

When the error detection information makes a transition from an error detected state to an error nondetected state, the internal state of the decoder maintains the internal state immediately prior to the transition to the error detected state. Therefore, an audio quality of a level equal to that of the conventional case can be maintained although there is some discontinuity in the compressed code. When the error detection information is altered from an error nondetected state to an error detected state, the decoder is inhibited of its decoding process. Discontinuity of the compressed code is irrelevant. During error detection, the expanded code immediately preceding the transition to the error detected state is continuously output. Therefore, discontinuity in the compressed code appears only at the transition from an error detected state to an error nondetected state of the error detection information. Therefore, the number of occurrence of discontinuity in the compressed codes can be reduced to half that in the conventional case. Therefore, the probability of noise generation can be reduced.

When the error detection information indicates an error detected state, i.e. when the decoder is inhibited of a decoding process, the state of the received signal becoming completely mute can be avoided by providing background noise from the background noise generator.

By selecting the output of either the ADPCM decoder or the noise suppression data generator according to the error detection information indicating presence/absence of an error in frame unit for the ADPCM coded data transmitted in frame unit, noise arising from discontinuity in the ADPCM codes in error detection can be suppressed. Also, by inhibiting the operation of the ADPCM decoder when an error is detected, the internal state can be maintained at the state prior to error detection. The deviation in the internal state with respect to the newly applied ADPCM code when coding is recommenced can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
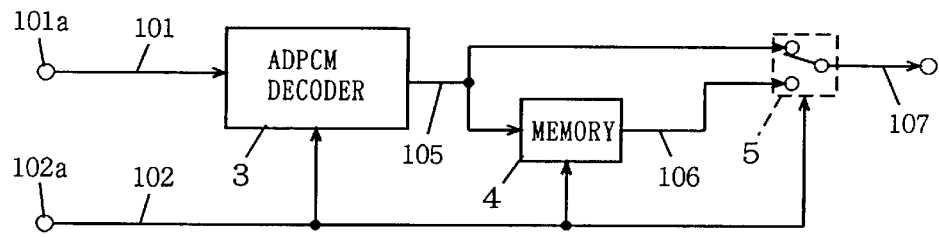
FIG. 1 schematically shows a structure of a reception data expander according to a first embodiment of the present invention.
Figure 36:
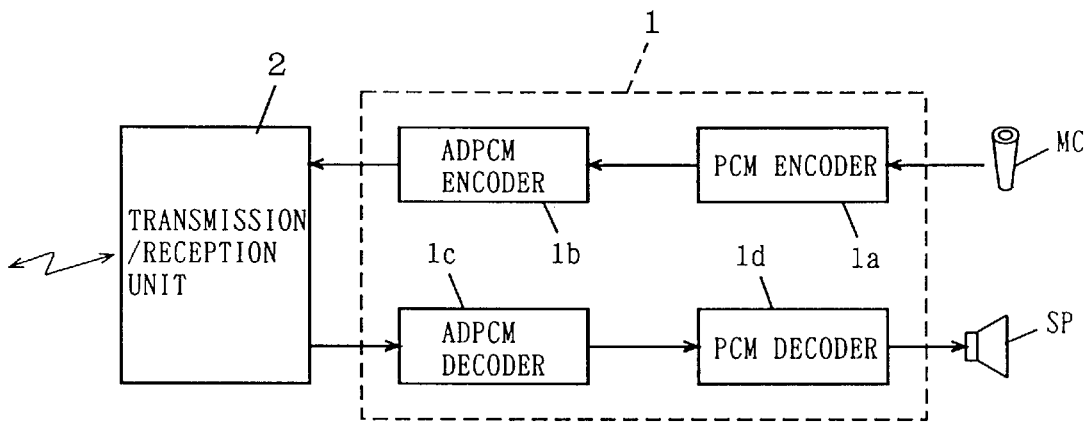
FIG. 36 schematically shows a structure of a conventional communication terminal.
Figure 37:
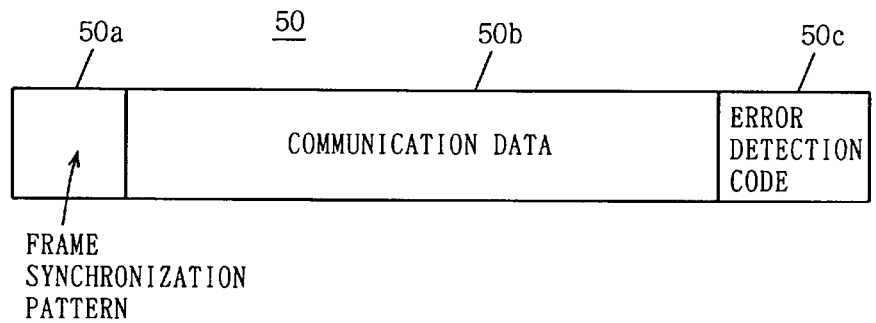
FIG. 37 schematically shows a frame structure of a received ADPCM code in a conventional communication terminal.
Figure 38:
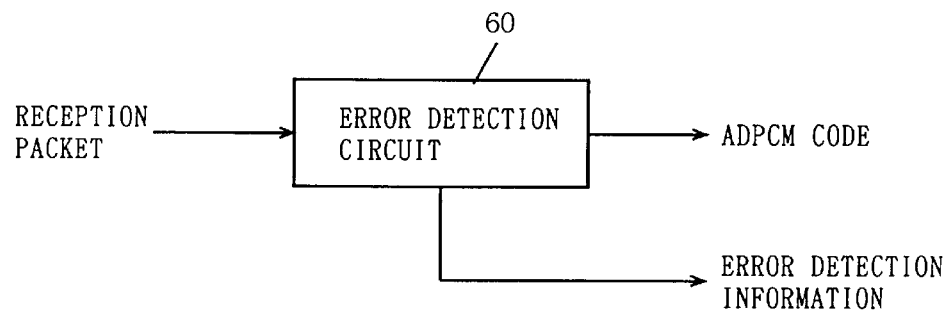
FIG. 38 schematically shows a structure of an error detection information generator in a conventional communication terminal.
Figure 39:
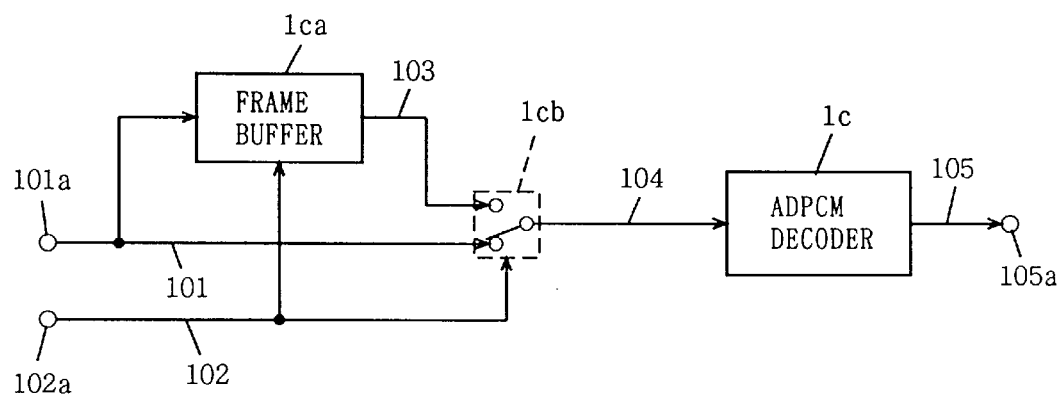
FIG. 39 schematically shows a structure of a conventional transmission error noise suppression unit.
Figure 40:
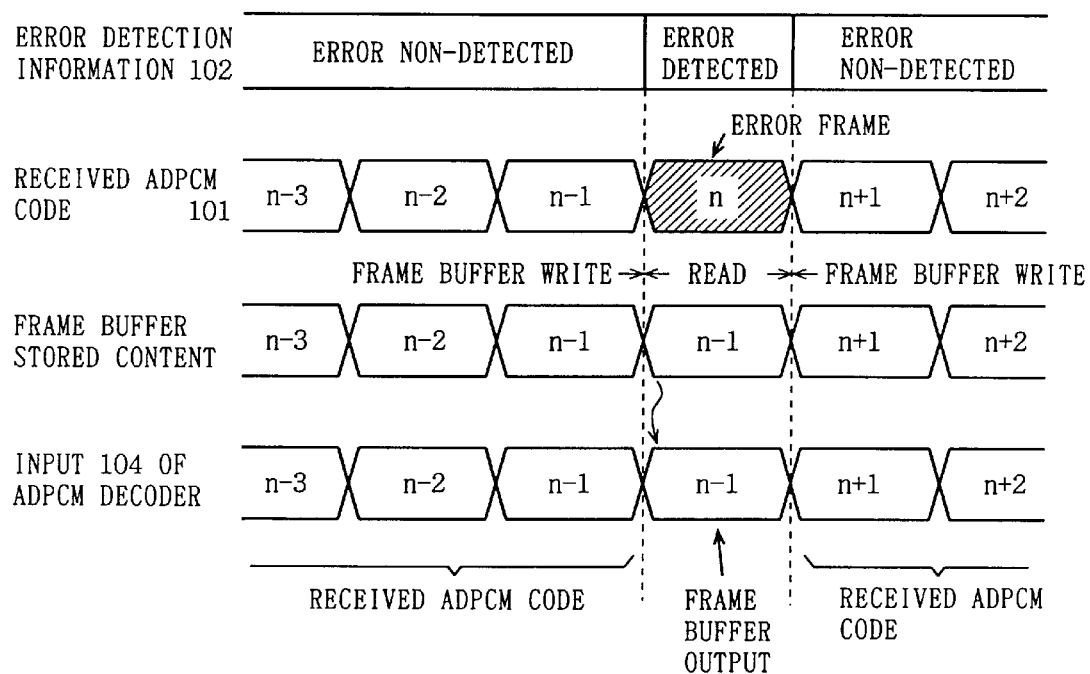
FIG. 40 shows an operation sequence of the device shown in FIG. 39.
Figure 41:
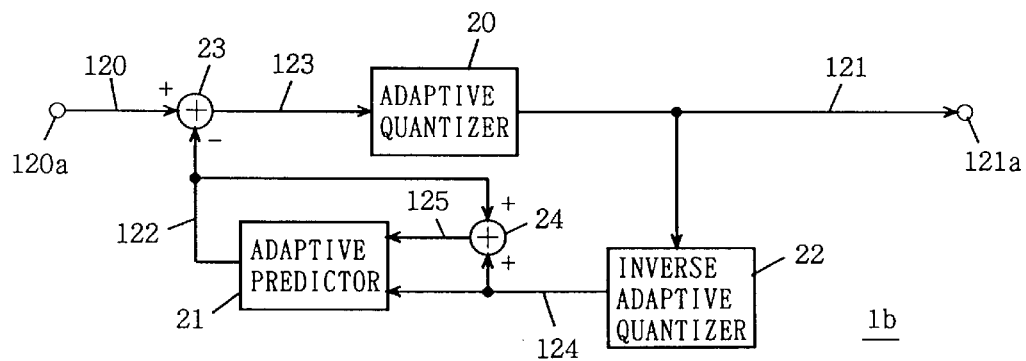
FIG. 41 shows the detail of a structure of the ADPCM decoder of FIG. 36.

Referring to FIG. 1, a reception data expander according to a first embodiment of the present invention includes an ADPCM decoder 3 receiving an ADPCM code 101 provided via an input node 101*a* coupled to a transmission path, and activated at an error nondetected state of error detection information 102 provided via an input node 102*a* to expand received ADPCM code 101 into a PCM code 105, a memory circuit 4 set to a write state in an error nondetected state of error detection information 102 for storing PCM code 105 from ADPCM decoder 3, and a reconstructed output switch 5 for selecting PCM code 105 from ADPCM decoder 3 or PCM code 106 read out from memory circuit 4 according to error detection information 102 to generate a PCM code 107 that is applied to the next-stage PCM decoder (refer to FIG. 36).

ADPCM decoder 3 is set to an inactive state to have its decoding operation inhibited when error detection information 102 indicates that there is an occurrence of reception data error in the frame. When error detection information 102 is set to an error detected state, memory circuit 4 has data writing thereinto inhibited, and is set to a read out state. The PCM coded data stored just before error detection is read out.

Figure 2:
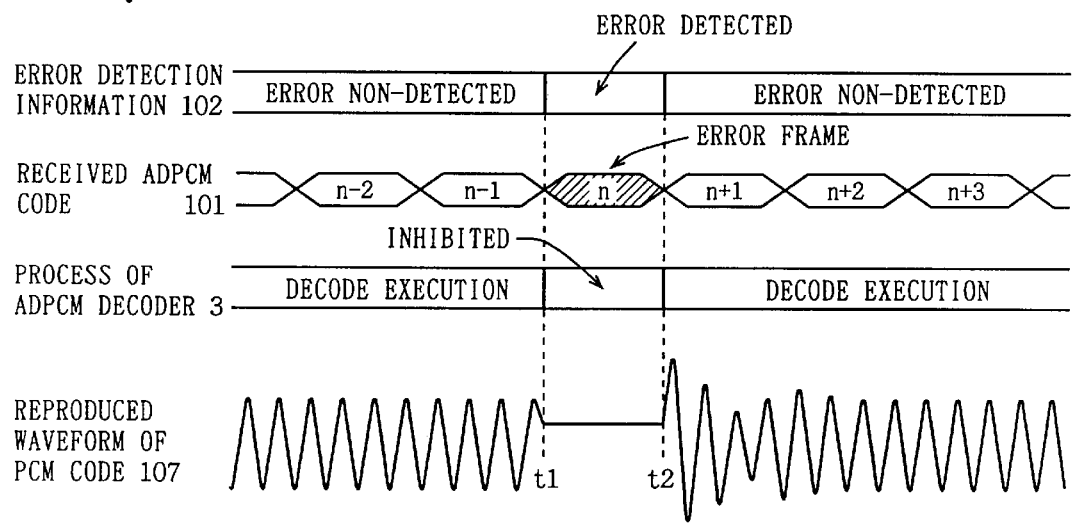
FIG. 2 shows an operation sequence of the reception data expander of FIG. 1.

When error detection information 102 indicates that there is no reception data error in the ADPCM code train applied via input node 101a, reconstructed output switch 5 selects PCM code 105 from ADPCM decoder 3 to provide the selected code as PCM code 107. When error detection information 102 indicates reception data error occurrence, PCM code 106 read out from memory circuit 4 is selected to be PCM code 107. The operation of the reception data expander of FIG. 1 will now be described with reference to the operation sequence diagram of FIG. 2. In FIG. 2, a tone signal is taken as an example for the signal wave form.

When error detection information 102 attains an error nondetected state, ADPCM decoder 3 is activated. A decoding operation (expansion process) is executed to generate PCM code 105 from ADPCM code 101. During this period, PCM code 105 is generated according to the ADPCM code in frames n−2 and n−1. In an error nondetected state, reconstructed output switch 5 selects PCM code 105 from ADPCM decoder 3. In this error nondetected state, PCM code 107 changes continuously, whereby a gentle or smooth reconstructed wave form is obtained. In the error nondetected state, memory circuit 4 stores PCM code 105 from ADPCM decoder 3. Memory circuit 4 stores only one PCM coded data. The stored content is sequentially updated by a write operation.

At time t1 when the frame changes from n−1 to n, error detection information 102 is set to an error detected state, indicating reception data error occurrence in frame n. Under this state, ADPCM decoder 3 is inactivated, and the decoding operation thereof is inhibited. Memory circuit 4 is switched from a write state to a read out state. The stored last PCM code in frame n−1 is output. Reconstructed output switch 5 selects and outputs PCM code 106 read out from memory circuit 4. As will be described in detail afterwards, only the data of one PCM code is stored in memory circuit 4. In this error detected period, the last PCM code of frame n−1 is continuously output. Therefore, at the transition from an error nondetected state to an error detected state, there is no influence of the discontinuity of ADPCM code 101. No noise is generated.

In the period of frame n in which reception data error occurs, muting will be inserted (reconstructed signal is a DC signal) by the PCM code continuously output from memory circuit 4 during reconstructing the voice signal. However, the time width of a frame is 5 ms–10 ms. Insertion of such a short mute period (5 ms–10 ms) is of a level in which disconnection is only slightly sensed in a reconstructed voice. Therefore, degradation of the audio quality is low.

At the elapse of this error frame period, error detection information 102 is set to an error nondetected state at time t2. ADPCM decoder 3 is activated again according to the error nondetected state of error detection information 102 to carry out a decoding operation on ADPCM code 101 included in the next frame n+1. Memory circuit 4 is set to a write state according to an error nondetected state of error detection information 102. PCM code 105 is written from ADPCM decoder 3 into memory circuit 4. Reconstructed output switch 5 selects PCM code 105 from ADPCM decoder 3. In an error nondetected state after time t2, PCM code 107 is generated according to ADPCM code 101 of sequentially provided frames n+1, n+2, n+3, . . . to reconstruct the voice signal.

Prior to time t2, ADPCM decoder 3 has the coding process inhibited. The internal variables (internal states) are maintained at the value updated at the last process of frame n−1 which is the frame immediately before reception data error is generated. When the frame length is approximately 5 ms–10 ms, there is a high probability that the voice signal wave forms of the two continuous frames approximate each other. Therefore, even when a decoding process is restarted using the value of the internal variables held in ADPCM decoder 3, the noise generation possibility arising from discontinuous ADPCM codes can be suppressed to a level approximately equal to that of the conventional case.

Figure 3:
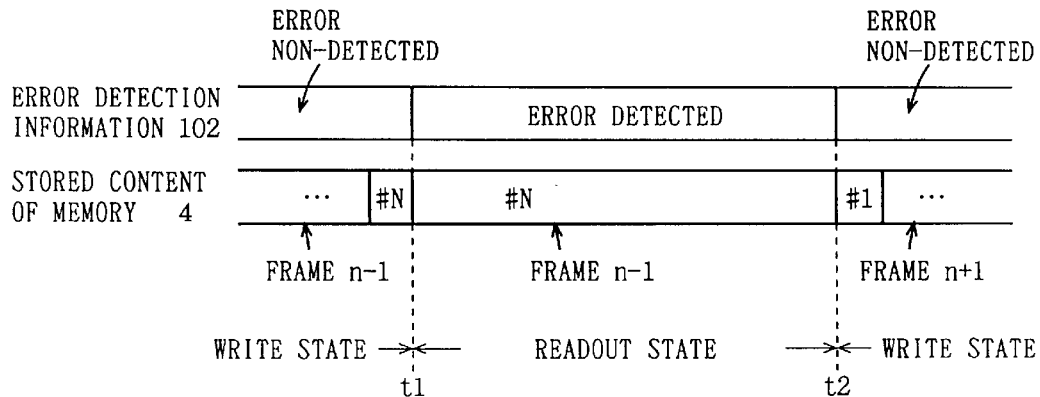
FIG. 3 shows a more detailed operation sequence of the reception data expander of FIG. 1 in transition of error detection information.

FIG. 3 shows an operation sequence of memory circuit 4 of FIG. 1. The operation of the memory circuit 4 will now be described with reference to FIG. 3.

When error detection information 102 is set to an error nondetected state, memory circuit 4 attains a write state to store PCM code 105 from ADPCM decoder 3. Memory circuit 4 has its stored content updated every writing of the PCM code. Therefore, always one PCM code is stored in memory circuit 4.

At the transition of error detection signal 102 from an error nondetected state to an error detected state at time t1, memory circuit 4 stores the last PCM code #N in frame n−1. When error detection information 102 attains an error detected state, memory circuit 4 is set at an read out state to continuously read out the stored PCM code #N of frame n−1. During the period of the frame in which the error is generated, the value of the PCM coded data stored in memory circuit 4 is fixed to the value of the last PCM code #N of frame n−1. Therefore, the series of PCM codes 106 read out from memory circuit 4 is a train of PCM codes of DC. At time t1, the PCM code is continuous, and no influence of discontinuity of ADPCM code 101 occurs.

At the transition from an error detected state to an error nondetected state of error detection information 102 at time t2, memory circuit 4 is set again to a write state to store PCM code 105 from the activated ADPCM decoder 3. After time t2, the first and subsequent PCM codes (#1 et seq.) of the next frame n+1 are sequentially stored in memory circuit 4. Before time t2 in an error detected state, the internal state of ADPCM decoder 3 is maintained at the state where the last PCM code #N of frame n−1 is generated. There is deviation in the probability distribution taken by each of ADPCM code in an error nondetected state. The possibility of taking a small differential value is high. When the frame length is approximately 5 ms–10 ms, the probability of the voice wave forms in continuous frames being approximating wave forms to each other is high. Therefore, the probability of the differential value error at the discontinuous point taking a small value is high even when the first ADPCM code #1 in frame n+1 is decoded according to the internal state (internal variables) corresponding to the last ADPCM code #N of frame n−1 being decoded. The influence of the discontinuity can be reduced to suppress the noise generation probability in a decoding process to a low level at subsequent discontinuous points.

Memory circuit 4 can take any structure as long as it has the storage capacity to store one PCM coded data, and be selectively set at a write state/read out state according to the error detection information. The structure as shown in FIG. 4, for example, can be employed.

Figure 4:
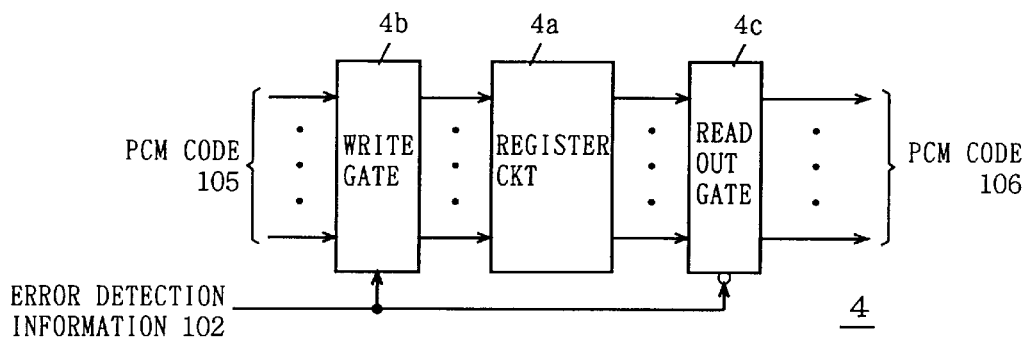
FIG. 4 schematically shows an example of a structure of a memory circuit of FIG. 1.

FIG. 4 shows an example of structure of memory circuit 4 of FIG. 1. Referring to FIG. 4, memory circuit 4 includes a register circuit 4a for storing PCM code data, a write gate 4b activated when error detection information 102 attains an error nondetected state to write PCM code 105 from ADPCM decoder 3 into register circuit 4a, and a read out gate 4c activated when error detection information 102 attains an error detected state to read out the PCM code data stored in register circuit 4a for generating PCM code 106. Register circuit 4a has the capacity to store one PCM code data.

Memory circuit 4 can easily be implemented by employing the structure shown in FIG. 4. Memory circuit 4 is required only to have the storage capacity to store one PCM code data, and the occupying area thereof can be reduced sufficiently.

According to the first embodiment of the present invention, a PCM decoding operation is carried out according to a PCM code from the ADPCM decoder when an error is not detected, and according to the PCM code generated right before error detection when an error is detected. Since the ADPCM decoder is rendered inactive during the error detected period, there is no effect of the discontinuity in the ADPCM codes at the transition from an error nondetected state to an error detected state. No noise is generated. Although there is an influence of the ADPCM code at the transition from an error detected state to an error nondetected state, the probability of the voice signals of two continuous frames having approximating wave forms to each other is high. Therefore, the noise generation probability arising from discontinuity in the ADPCM codes can be suppressed to a low level equal to that of a conventional case. Furthermore, the device complexity and power consumption can be reduced since memory circuit has only to store one PCM code.

Second Embodiment

Figure 5:
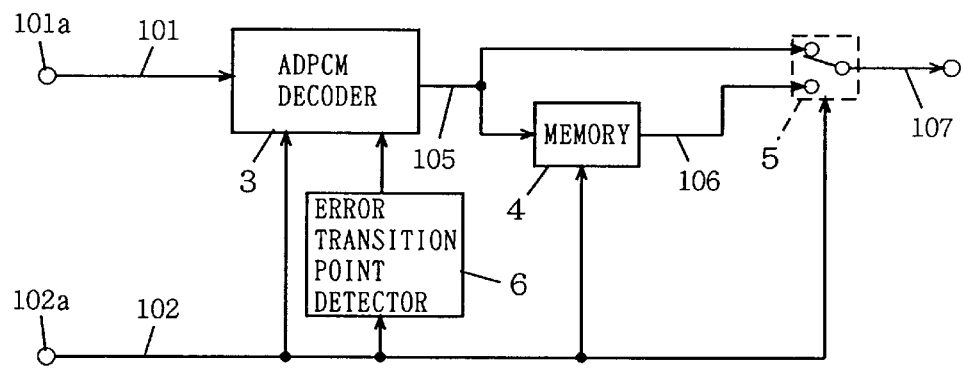
FIG. 5 schematically shows a structure of a reception data expander according to a second embodiment of the present invention.

FIG. 5 schematically shows a structure of a reception data expander according to a second embodiment of the present invention. Referring to FIG. 5, a reception data expander includes an error transition point detector 6 for detecting the transition point from an error detected state to an error nondetected state of error detection information 102 provided via a node 102a, an ADPCM decoder 3 substituting a predetermined internal variable in response to a transition point detection designation from error transition point detector 6, and performing an expansion process on ADPCM code 101 from input node 101a coupled to the transmission path according to the substituted internal variable for generating PCM code 105, a memory circuit 4 for storing PCM code 105 from ADPCM decoder 3 when error detection information 102 attains an error nondetected state, and a reconstructed output switch 5 for selectively passing through one of PCM code 105 from ADPCM decoder 3 and PCM code 106 read out from memory circuit 4 to output the same as PCM code 107.

Figure 6:
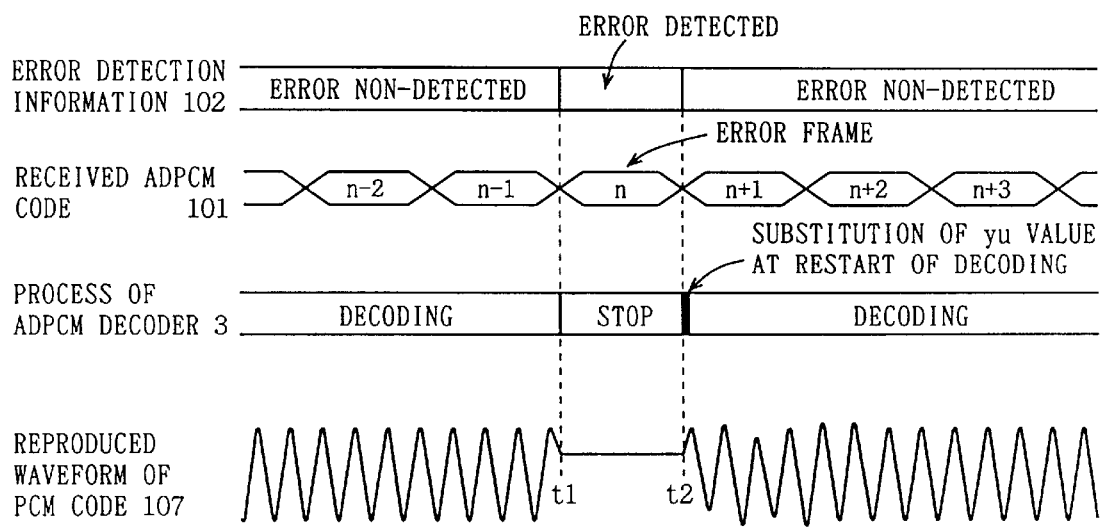
FIG. 6 shows an operation sequence of the reception data expander of FIG. 5.
Figure 42:
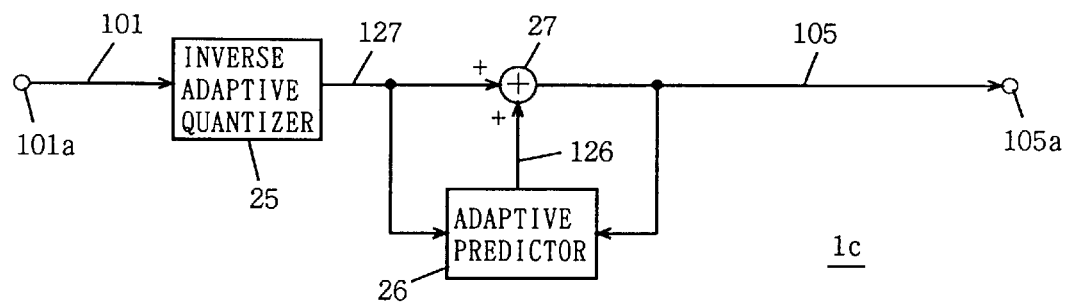
FIG. 42 shows in more detail the structure of the ADPCM decoder of FIG. 36.
Figure 43:
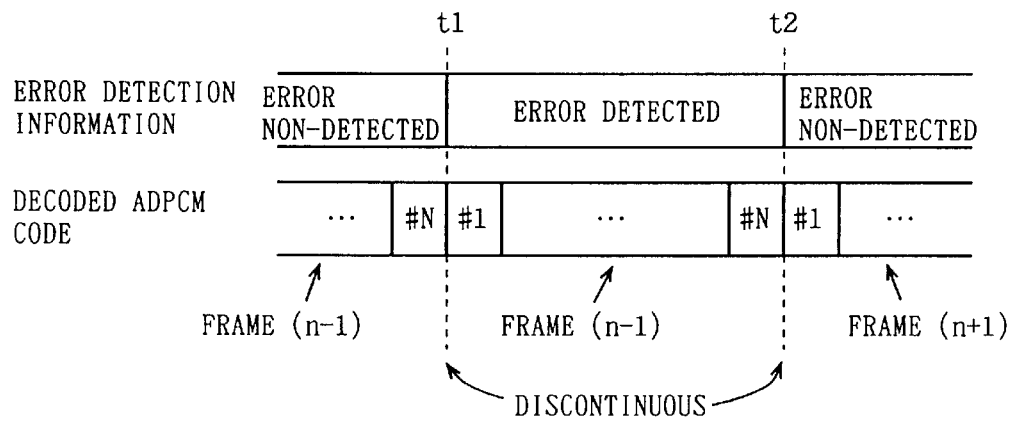
FIG. 43 is a diagram for describing problems in the conventional transmission error noise suppression method.

ADPCM decoder 3 carries out an inverse adaptive quantization process on the ADPCM code as already described with reference to FIG. 42. The details of the internal structure of ADPCM decoder 3 will be described afterwards. In the inverse adaptive quantization process, a scale factor y(k) is used for each ADPCM code. A quantization differential signal is generated from the ADPCM code according to the adaptively obtained quantization scale factor y(k). Scale factor y(k) includes a high speed scale factor yu(k) and a low speed scale factor yl(k). High speed scale factor yu(k) corresponds to a signal that has a great variation in the differential signal (such as voice signal). Low speed scale factor yl(k) corresponds to a signal such as an voice-band data signal and tone signal that have a small variation in the differential signal. Low speed scale factor yl(k) has a slow changing speed. The value thereof can be assumed to be substantially constant in two continuous frames. At the transition from an error detected state to an error nondetected state, the high speed scale factor value before error detection is substituted with a high speed scale factor yu(k) obtained by scaling of low speed scale factor yl(k) in ADPCM decoder 3. The operation of the device shown in FIG. 5 will now be described with reference to the operation sequence diagram of FIG. 6.

In an error nondetected state before time t1, ADPCM decoder 3 attains an active state to perform an expansion process on received ADPCM code 101 to generate PCM code 105. Memory circuit 4 stores this PCM code 105 from ADPCM decoder 3. When error detection information 102 attains an error detected state, ADPCM decoder 3 is inhibited of the decoding operation, and the internal state is maintained at the state of expanding the last ADPCM code of frame n−1 just before error detection. Memory circuit 4 is brought to a read out state from a write state. In the period of frame n in which reception data error occurs (the period from time t1 to time t2), the last PCM code 106 of frame n−1 just before error detection is read out from memory circuit 4 to be applied to reconstructed output switch 5. This operation is similar to the operation of the previous first embodiment.

At the transition from an error detected state to an error nondetected state of error detection information 102, error transition point detector 6 provides an error transition point detection designation to ADPCM decoder 3. In response to the error transition point detection designation from error transition point detector 6, ADPCM decoder 3 has the held high speed scale factor yu(k) substituted with a value $(2^{-a} \cdot yl(k))$ that is a scaled version of the internally held low speed scale factor yl(k). Using the substituted high speed scale factor and the low speed scale factor, scaling factor y(k) is generated. A decoding process of ADPCM code 101 of a proper frame n+1 provided after time t2 is carried out at ADPCM decoder 3.

The internal variable is altered according to the applied ADPCM code thereafter, whereby a decoding process is sequentially carried out. The advantage of substituting high speed scale factor yu(k) with a scaled low speed scale factor yl(k) will now be described.

Figure 7:
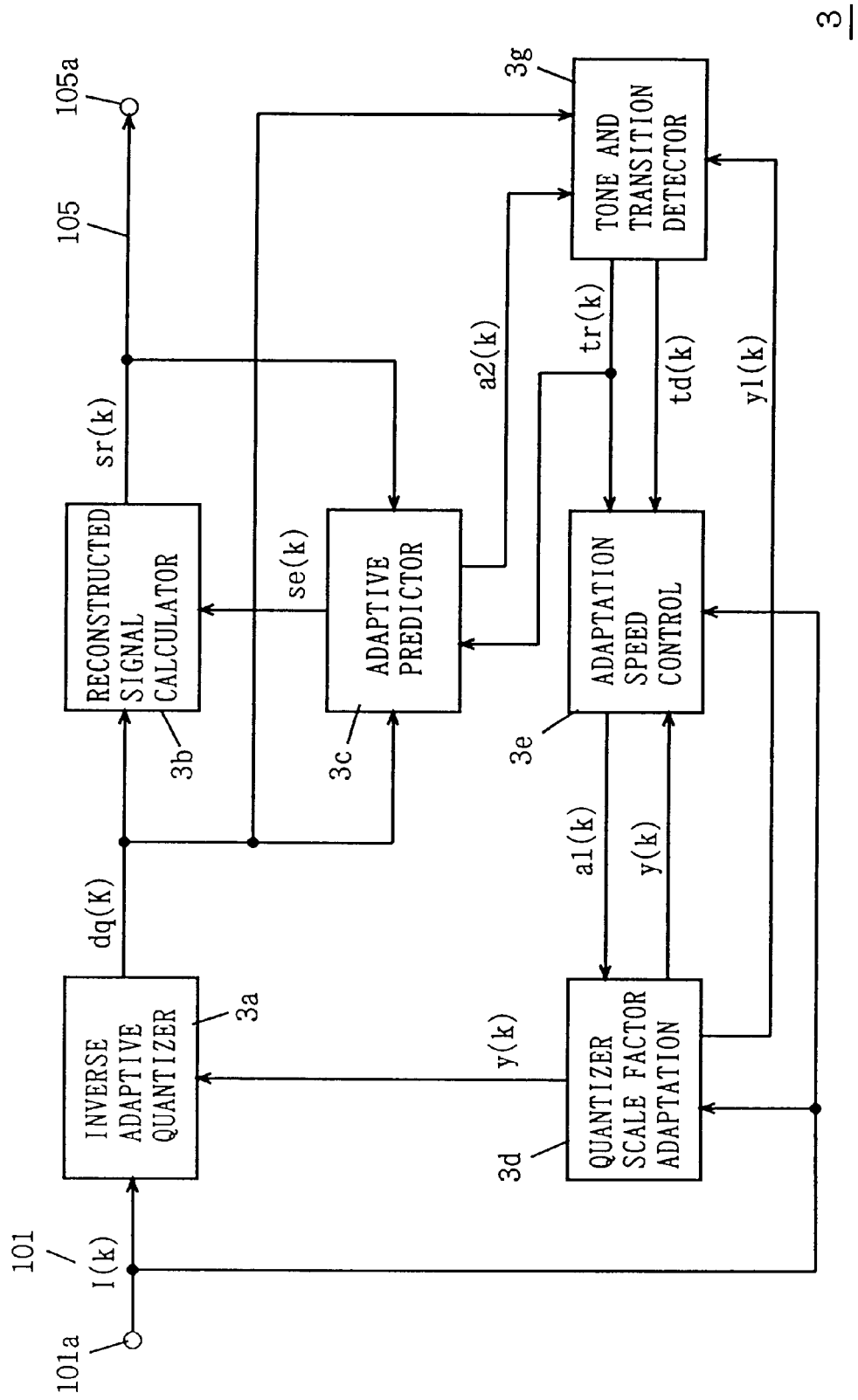
FIG. 7 shows a detailed structure of an ADPCM decoder employed in the present invention.

FIG. 7 shows a more detailed structure of ADPCM decoder 3 of FIG. 5. Referring to FIG. 7, ADPCM decoder 3 includes an inverse adaptive quantizer 3a for generating a quantized differential signal dq(k) from ADPCM code 101 (I(k)) and quantization scale factor y(k), a reconstructed signal calculator 3b for generating a reconstructed signal sr(k) from quantized differential signal dq(k) and a prediction signal se(k) to output the same as PCM code 105, and an adaptive predictor 3c for generating prediction signal se(k) from quantized differential signal dq(k) and reconstructed signal sr(k). All the signals are sampled digital signals. The character k in the parenthesis of each signal indicates the sampling time.

ADPCM decoder 3 further includes a quantizer scale factor adaptation 3d for generating a quantization scale factor y(k) according to ADPCM code 101 (I(k)) and adaptive speed control variable a1(k), and a tone and transition detector 3g for generating speed variables tr(k) and td(k) according to scale factor y(k), ADPCM code 101 (I(k)), a predictor coefficient a2(k) from adaptive predictor 3c and quantized differential signal dq(k) to provide the speed variables to adaptive predictor 3c and adaptation speed control 3e. The operation of each component will now be described.

Inverse adaptive quantizer 3a converts an input ADPCM code 101 (I(k)) into quantized differential signal dq(k) using a quantizer scale factor y(k) from quantizer scale factor adaptation 3d. A differential signal (differential signal of prediction signal se(k) and input PCM signal si(k)) is quantized, coded, and then is transmitted as input signal I(k). In an adaptive quantizer, the differential signal is converted into a logarithm with 2 as the base, and then normalized with a scale factor y(k). More specifically, the value normalized according to the expression of $\log_2(d(k))-y(b)$ is then quantized. By coding this quantized value, ADPCM code 101 (I(k)) is obtained.

Inverse adaptive quantizer 3a carries out an operation inverse to the adaptive quantization process of this adaptive quantizer. More specifically, input signal I(k) is scaled by a quantization scale factor y(k) provided from quantizer scale factor adaptation 3d. The scaled value is converted into an anti-logarithm from a logarithm to obtain quantized differential signal dq(k).

Quantizer scale factor adaptation 3d generates scale factor y(k) according to ADPCM code 101 (I(k)) and adaptive speed control variable a1(k). Quantizer scale factor adaptation 3d adaptively obtains a scale factor yu(k) of high speed and a scale factor yl(k) of low speed. High speed scale factor yu(k) corresponds to a signal that has a great variation in the differential signal such as voice signal. Low speed scale factor yl(k) corresponds to a signal that has a small variation in the differential signal such as a tone signal and voice-band data. High speed scale factor yu(k) and low speed scale factor yl(k) are provided by the following equations.

$$yu(k)=(1-2^{-5})\cdot y(k)+2^{-5}\cdot W[I(k)]$$

$$yl(k)=(1-2^{-6})\cdot yl(k-1)+2^{-6}\cdot yu(k)$$

where yu(k) is restricted to the range of $1.06 \leq yu(k) \leq 10.00$.

W[I(k)] is a discrete function that takes a predetermined discrete value according to input I(k). By using a coefficient such as $(1-2^{-5})$, the effect from the past is made finite at the adaptation process. Even when transmission error occurs, the internal states of the encoder and the decoder converge so as to match each other. These coefficients are called leakage (leak) coefficients. Scale factor y(k) is obtained by combining high speed scale factor yu(k) and low speed scale factor yl(k) using an adaptive speed control variable a1(k) according to the following equation.

$$y(k)=a1(k)\cdot yu(k-1)+[1-a1(k)]\cdot yl(k-1)$$

where $0 \leq a1(k) \leq 1$.

In quantizer scale factor adaptation 3d, high speed scale factor yu(k) and low speed scale factor yl(k) are reset to predetermined initial values (544 and 34816) according to a reset signal. As will be described afterwards, the high speed scale factor yu(k) is obtained by a scaled version of low speed scale factor yl(k) at the transition from an error detected state to an error nondetected state of error detection information 102.

Adaptive speed control variable a1(k) from adaptation speed control 3e approaches 1 in the case of a voice signal and approaches 0 in the case of a voice-band data signal and a tone signal. More specifically, scale factor y(k) has a greater influence of high speed scale factor yu(k) in the case of a voice signal and has a greater influence of low speed scale factor yl(k) in the case of an voice-band data signal and tone signal. Adaptive speed control variable a1(k) is calculated by the changing rate of the differential signal. Two types of values are calculated indicating the average of the magnitude of input ADPCM code 101 (I(k)).

$$dms(k)=(1-2^{-5})\cdot dms(k-1)+2^{-5}\cdot F[I(k)]$$

$$dml(k)=(1-2^{-7})\cdot dml(k-1)+2^{-7}\cdot F[I(k)]$$

Function F[I(k)] is a function that takes a discrete value according to the value of input ADPCM code 101 (I(k)). Dms(k) indicates the average value over a relatively short time of function F[I(k)], and dml(k) indicates the average value over a relatively long time of function F[I(k)]. Variable ap(k) is defined using these two types of average values dms(k) and dml(k) as below.

(i) When $|dms(k)-dml(k)| \geq 2^{-3}\cdot dml(k)$:

$$ap(k)=(1-2^{-4})\cdot ap(k-1)+2^{-3}$$

(ii) When y(k)<3:

$$ap(k)=(1-2^{-4})\cdot ap(k-1)+2^{-3}$$

(iii) When td(k)=1:

$$ap(k)=(1-2^{-4})\cdot ap(k-1)+2^{-3}$$

(iv) When tr(k)=1:

$$ap(k)=1$$

(v) Otherwise:

$$ap(k)=(1-2^{-4})\cdot ap(k-1)$$

In the above condition (i), variable ap(k) approaches 2 (a geometric progression with a first term of 1/8 and a common ratio of 1/16) when the difference between average values dms(k) and dml(k) is great, i.e. when the average value of the level of input ADPCM code I(k) changes greatly, and approaches 0 (a geometric progression with a common ratio of 15/16) from condition (v) when the difference between average values dms(k) and dml(k) is small, i.e., when the average value of the level of input ADPCM code I(k) is relatively constant.

Y(k)<3 in the above condition of (ii) indicates that communication using an empty channel is carried out. In this case, variable ap(k) approaches 2.

A narrow-band signal is indicated by td(d)=1 as will be described afterwards. In this case, variable ap(k) approaches 2.

When transition of a narrow-band signal is detected ((iv) when indicated by tr(k)=1), variable ap(k) is set to 1. Adaptive speed control variable a1(k) is obtained from this variable ap(k−1) according-to the following equation.

$$a1(k)=1: ap(k-1)>1,$$

$$a1(k)=ap(k-1): ap(k-1)\leq 1$$

By the limitation for the asymmetrical adaptive speed control variable a1(k), the transition of the adaptive speed from high to low is delayed until the absolute value of input ADPCM code I(k) maintains a constant value. This is to prevent erroneous transition from a high speed adaptive state to a low speed adaptive state for a pulsive input signal. In other words, the process must be carried out in a high speed adaptive state since the differential signal makes a great change for a pulsive input signal. This is realized by making adaptive speed control variable a1(k) approach 1 to increase the effect of high speed scale factor yu(k) and calculate quantization scale factor y(k).

In adaptive speed control unit 3e, variable ap(k) is initialized to 0 as well as for average values dms(k) and dml(k) initialized to 0 according to generation of a reset signal. Therefore, adaptive speed control variable a1(k) is also reset to the initial value of 0 at the reset of coefficients ap(k), dms(k) and dml(k). In other words, the adaptive speed is slowed down by this reset operation (by the reset value, scale factor y(k) has high speed scale factor yu(k) rendered invalid, and will be provided by low speed scale factor yl(k)).

Adaptive predictor 3c calculates a prediction signal se(k) from quantized differential signal dq(k). In adaptive predictor 3c, two types of adaptive predictions are carried out. Prediction signal se(k) is calculated according to the following equation.

$$se(k) = \Sigma ai(k-1) \cdot sr(k-1) + sez(k)$$

where summation $\Sigma$ is carried out for i=1 and 2.

$$Sez(k) = \Sigma bi(k-1) \cdot dq(k-1)$$

where summation $\Sigma$ is carried out for i=1 to 6.

Reconstructed signal sr(k−i) calculated by reconstructed signal calculator 3b is defined by the following equation.

$$Sr(k-i) = se(k-i) + dq(k-i)$$

Coefficients a1(k) and a2(k) used in the second order pole prediction used to obtain prediction signal se(k) are provided by the following equations.

$$a1(k) = (1-2^{-8}) \cdot a1(k-1) + (3 \cdot 2^{-8}) \cdot sgn[p(k)] \cdot sgn[p(k-1)]$$

$$a2(k) = (1-2^{-7}) \cdot a2(k-1) + (2^{-7} \{sgn[p(k)] \cdot sgn[p(k-2)] - f[a1(k-1)] \cdot sgn[p(k)] \cdot sgn[p(k-1)]\}$$

Here, p(k)=dq(k)+sez(k). Function f is defined by the following equation.

$$f(a1) = 4 \cdot a1: |a1| \leq 2^{-1}$$

$$f(a1) = 2 \cdot sgn(a1): |a1| > 2^{-1}$$

Function sgn[p(k)] indicates the sign of p(k).

When tr(k)=1, variables a1(k) and a2(k) are both set to 0 (a1(k)=a2(k)=0).

The other coefficient bi(k) used in the sixth order zero prediction is provided by the following equation.

$$bi(k) = (1-2^{-8}) \cdot bi(k-1) + 2^{-7} \cdot sgn[dq(k)] \cdot sgn[dq(k-i)]$$

$$i = 1, 2, \ldots, 6$$

When tr(k)=1, all coefficients b1(k)~b6(k) are set to 0 (b1(k)=b2(k)= . . . =b6(k)=0).

In reconstructed signal calculator 3b, reconstructed signals sr(k−1) and sr(k−2) are reset to a predetermined value (32) when a reset signal is applied. In adaptive predictor 3c, coefficients b1(k−1)~b6(k−1) are all reset to 0 according to the reset signal. Also, coefficients a1(k−1) and a2(k−1), and then ap(k−1) are reset to 0. In response, adaptive speed control variable a1(k) is reset to 0. Furthermore, in adaptive predictor 3c, variables p(k−1) and p(k−2) are reset to a predetermined value (0), and quantized differential signals dq(k−1)~dq(k−6) are reset to a predetermined value (32).

Tone and transition detector 3g shifts the adaptive speed of the inverse quantizer to the high speed side when a narrow band signal such as a tone signal and voice-band data signal is detected. More specifically, control variable td(k) is defined by the following equation.

(i) When a2(k)<−0.71875: td(k)=1

(ii) Otherwise, td(k)=0

In other words, when transition of the detected narrowband signal is detected, coefficients a1, a2 and bi(k) in adaptive predictor 3c are all set to 0. More specifically, variable tr(k) is defined by the following equation.

(i) When a2(k)<−0.71875 and |dq(k)|>24·2·esp(yl(k)): tr(k)=1

(ii) Otherwise: tr(k)=0

A specific structure of ADPCM decoder 3 of FIG. 7 is disclosed in ITU Recommendation G.726.

It is scale factor y(k) that greatly affects the amplitude of a reproduced signal when error transition point detector 6 of FIG. 5 detects a transition point where error detection information 102 attains an error nondetected state from an error detected state. In order to suppress generation of noise at the transition point, the value of scale factor y(k) must be as accurate as possible. As described above, scale factor y(k) is provided by:

$$y(k) = a1(k) \cdot yu(k-1) + [1 - a1(k)] \cdot yl(k-1)$$

This is obtained by combining low speed scale factor yl(k) and high speed scale factor yu(k) using adaptive speed control variable a1(k). In other words, low speed scale factor yl(k) and high speed scale factor yu(k) must be correct values in order to suppress noise.

Low speed scale factor yl(k) can be developed according to the following equation.

$$yl(k) = (1-2^{-6}) \cdot yl(k-2) + 2^{-6} \cdot yu(k)$$
$$= (1-2^{-6})^2 \cdot yl(k-2) + 2^{-6} \{yu(k) + (1-2^{-6}) \cdot yu(k-1)\}$$
$$= \ldots$$
$$= (1-2^{-6})^n \cdot yl(k-n) + 2^{-6} \{yu(k) + (1-2^{-6}) \cdot yu(k-1) + \ldots + (1-2^{-6})^n \cdot yu(k-n)\}$$
$$= \ldots$$
$$= (1-2^{-6})^K \cdot yl(0) + 2^{-6} \{yu(k) + (1-2^{-6})yu(k-1) + \ldots + (1-2^{-6})^k \cdot yu(0)\}$$

Low speed scale factor yl(k) is an average (average value over time) of high speed scale factor yu(k) that is given weight by (1−2$^{-6}$), and exhibits a gentle transition. In the process of obtaining low speed scale factor yl(k), a low pass filter process is carried out on high speed scale factor yu(k) to obtain low speed scale factor yl(k). Therefore, it is assumed that the change in value of low speed scale factor yl(k) over a period including the frame in which error is detected is small. The value held when the decoding process of ADPCM decoder 3 is inhibited can be used as low speed scale factor yl(k) when a decoding process is started again. High speed scale factor yu(k) is obtained by scaling low speed scale factor yl(k) that provides the proper value according to the relationship between value 544 and value 34816 of scale factors yu(k) and yl(k) at initialization and according to the following equation.

$$yu(k)=2^{-6}\cdot yl(k)$$

By substituting high speed scale factor yu(k) which is the internal variable of ADPCM decoder 3 using low speed scale factor yl(k) that provides a proper value when error detection information 102 makes a transition from an error detected state to an error nondetected state, the error of scale factor y(k) in restarting an ADPCM decoding process can be reduced to suppress noise generation. The reason why high speed scale factor yu(k) is substituted according to low speed scale factor yl(k) will be described.

Figure 8A:
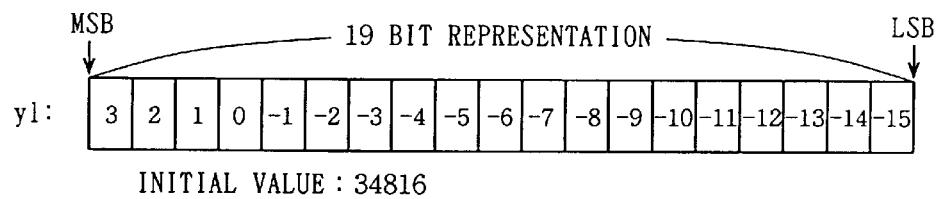
FIGS. 8A and 8B show the structure of the scale factor for low speed and high speed, respectively.
Figure 8B:
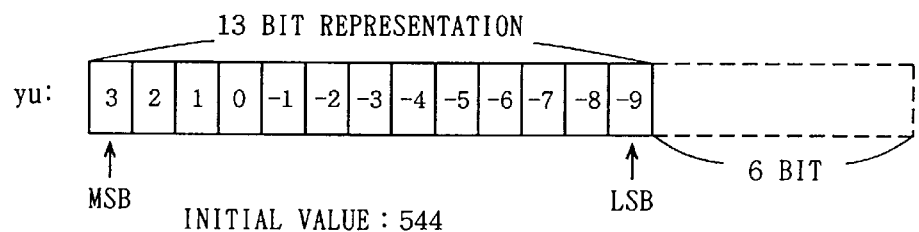

FIG. 8A shows the bit configuration of low speed scale factor yl(k), and FIG. 8B shows a bit configuration of high speed scale factor yu(k). This bit configuration of high speed and low speed scale factors yl(k) and yu(k) is defined in the aforementioned ITU recommendation G.726.

It is appreciated from FIG. 8A that low speed scale factor yl(k) is represented by 19 bits having the digits of $2^3 \sim 2^{-15}$. The numeric value in each section indicates the weight of each digit (for example, "3" indicates the digit of $2^3$). Low speed scale factor yl(k) is reset to 34816 at the time of reset.

It is appreciated from FIG. 8B that high speed scale factor yu(k) is represented by 13 bits of digits of $2^3 \sim 2^{-9}$. The numeric value in each section similarly indicates the weight of each digit. High speed scale factor yu(k) is reset to the value of 544 at the time of reset. The relationship between the reset value (initial value) of low speed scale factor yl(k) and the reset value (initial value) of high speed scale factor yu(k) is set so that the initial value of low speed scale factor yl is $2^6$ times that of the high speed scale factor yu. More specifically, at the initial value, high speed scale factor yu can be obtained by arithmetic-shifting low speed scale factor yl rightwards by 6 bits (insert 0 into the upper bits after shifting) and taking most significant 13 bits. By using a high speed scale factor that satisfies the relationship similar to that upon initialization as high speed scale factor yu(k) upon restarting a decoding process, a relatively accurate high speed scale factor yu can be obtained. As a result, the error of scale factor y(k) can be reduced.

As shown in FIGS. 8A and 8B, low speed scale factor yl(k) can further be shifted rightwards by 12 bits (1 bit must be left). Therefore, most significant 13 bits of low speed scale factor yl that is arithmetic-shifted by 18 bits (6 bits+12 bits) can be used as high speed scale factor yu(k). Therefore, a value satisfying the following relationship can be used as high speed scale factor yu in restarting a decoding process.

$$yu=2^{-a}\cdot yl(k)$$

where a is a natural number satisfying $6 \leq a \leq 18$.

In practice, the lower limit value of high speed scale factor yu(k) is determined. All values smaller than 1.06 are clipped at this lower limit. This means that all values of a>10 provide the same high speed scale factor. Therefore, substitution of a high speed scale factor in restarting a decoding process can be carried out according to the following equation.

$$yu(k)=2^{-a}\cdot yl(k)$$

where a is a natural number satisfying $6 \leq a \leq 10$.

As described above, by setting the exponent, a, to a value greater than 6 and taking a great scaling amount of low speed scale factor yl(k), the value of scale factor y(k) is reduced. In response, the reconstructed signal right after restarting a decoding process by the ADPCM decoder temporarily attains a muted state. Therefore, a noise generation suppression effect of a level equal to or greater than that of the case where a=6 can be obtained.

Figure 9:
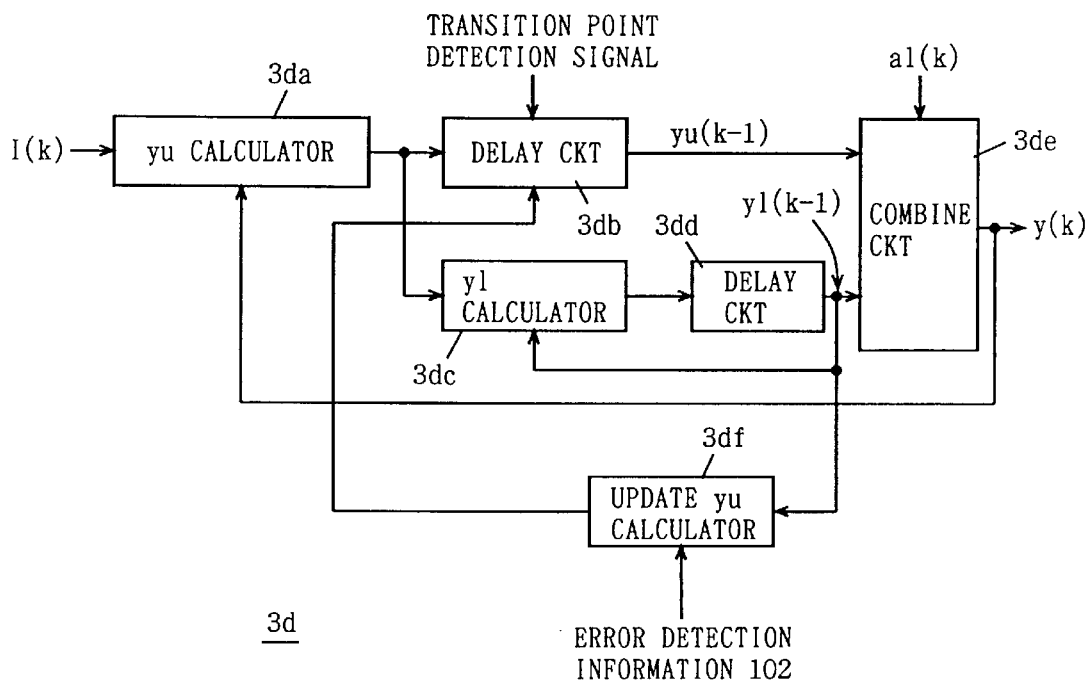
FIG. 9 schematically shows a structure of a quantizer scale factor adaptation of FIG. 7.

FIG. 9 schematically shows an internal structure of quantizer scale factor adaptation 3d of FIG. 7. Referring to FIG. 9, quantizer scale factor adaptation 3d includes a yu calculator 3da receiving input ADPCM code I(k) to calculate high speed scale factor yu(k) according to function W and scale factor y(k), a delay circuit 3db for delaying the high speed scale factor calculated by yu calculator 3da for 1 sampling period, a yl calculator 3dc for calculating a low speed scale factor yl(k) according to the high speed scale factor calculated by yu calculator 3da and low speed scale factor yl(k−1) of the previous sampling period, a delay circuit 3dd for delaying output data of yl calculator 3dc for 1 sampling period to generate low speed scale factor yl(k−1), a combine circuit 3de for combining scale factors yu(k−1) and yl(k−1) output from delay circuits 3db and 3dd according to adaptive speed control variable al(k) to generate scale factor y(k), and an update yu calculator 3df for calculating and outputting updated high speed scale factor that is to be substituted at the time of recommencing decoding according to low speed scale factor yl(k−1) from delay circuit 3db when error detection information 102 indicates an error detected state.

Figure 10:
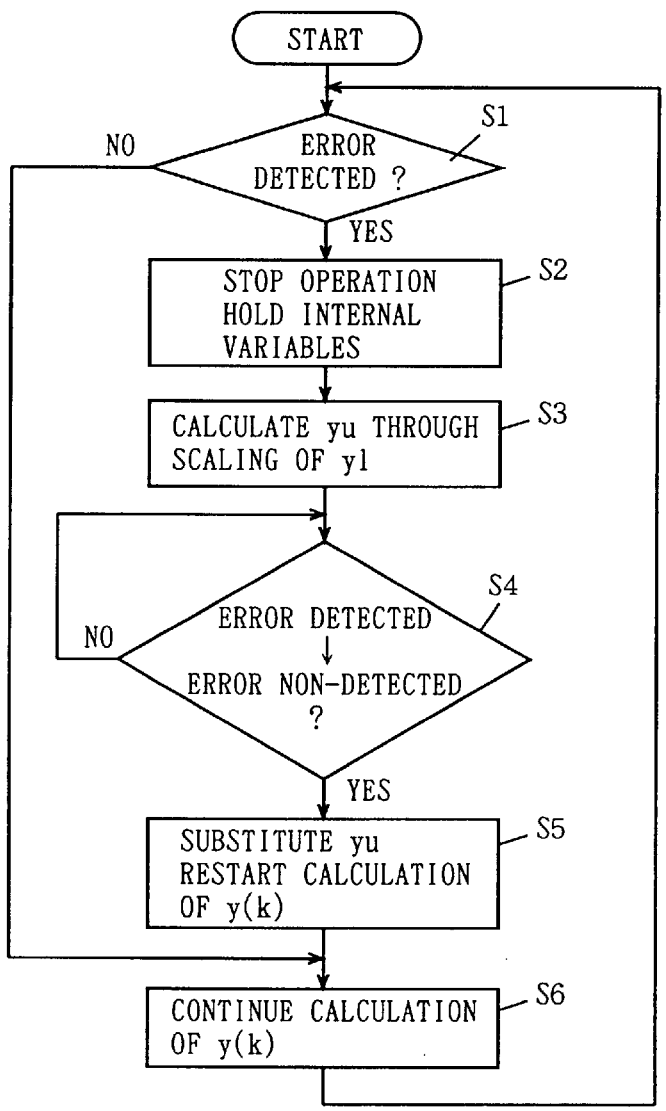
FIG. 10 is a flow chart representing an operation of the quantizer scale factor adaptation of FIG. 7.

The updated high speed scale factor from update yu calculator 3df is stored in delay circuit 3db according to a transition point detection signal from error transition point detector 6 shown in FIG. 5. The content held in delay circuit 3db is updated. The operation of quantizer scale factor adaptation 3d of FIG. 9 will now be described with reference to the flow chart of FIG. 10.

Determination is made whether there is a reception data error according to error detection information 102 (step S1). When error detection information 102 is set to an error detected state, quantization scale factor adaptation unit 3d is inhibited of its scale factor calculation operation, and holds the internal variables (step S2). Under this state, high speed scale factor yu is calculated through scaling of low speed scale factor yl to be held by update yu calculator 3df. This state is maintained at the duration of error detection information 102 attaining an error detected state. When error detection information 102 makes a transition from an error detected state to an error nondetected state (step S4), delay circuit 3db substitutes the held high speed scale factor with a high speed scale factor calculated by update yu calculator 3df according to activation of a transition point detection signal. Using this substituted high speed scale factor, the calculation operation of the scale factor for a newly provided ADPCM code I(k) is recommenced (step S5).

The updated high speed scale factor is rewritten with the newly provided high speed scale factor. The calculation operation of scale factor y(k) for each input ADPCM code I(k) is continued. When error detection information 102 is set to an error nondetected state, the calculation operation of scale factor y(k) is executed continuously according to step S6 since the decoding operation is carried out continuously.

In the above description, calculation of scale factor y(k) is carried out using a hardware. However, the calculation can be carried out in a software manner, or by using a digital signal processor (DSP).

According to the second embodiment of the present invention, the high speed scale factor is substituted with a value obtained through scaling of the held low speed scale factor in recommencing decoding of an ADPCM code. Therefore, the value of quantization scale factor in recommencing the process can be approximated substantially to the correct value. Noise generation arising from discontinuity in the ADPCM codes at recommencing the process can be suppressed.

Third Embodiment

Figure 11:
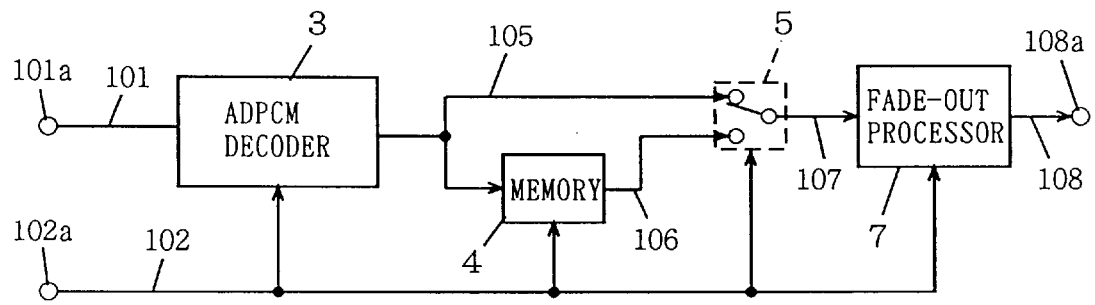
FIG. 11 schematically shows a structure of a reception data expander according to a third embodiment of the present invention.
Figure 12:
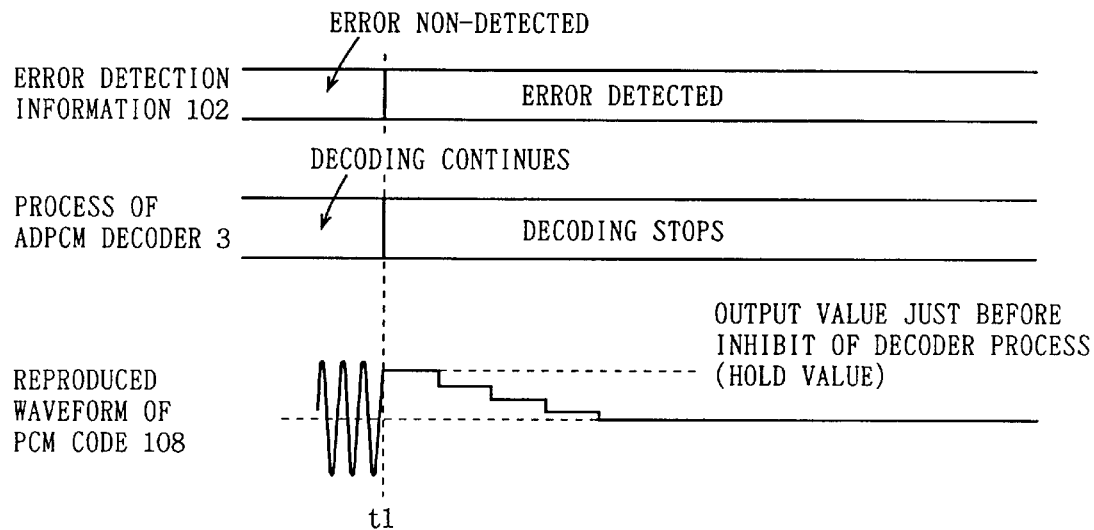
FIG. 12 shows an operation sequence of the reception data expander of FIG. 11.

FIG. 11 schematically shows a structure of a reception data expander according to a third embodiment of the present invention. The structure of the third embodiment shown in FIG. 11 differs from the structure of the first embodiment of FIG. 1 in the following point. In the third embodiment of the present invention, a fade out processor 7 is provided that receives a PCM code 107 from reconstructed output switch 5 to gradually attenuate the received PCM code 107 right after transition of error detection information 102 to an error detected state. When error detection information 102 attains an error nondetected state, fade out processor 7 provides PCM code 107 from reconstructed output switch 5 transparently as PCM code 108, which is provided to the PCM decoder of the next stage via node 108a. The operation of the reception data expander of the third embodiment will now be described with reference to the operation sequence diagram of FIG. 12.

When error detection information 102 attains an error nondetected state, ADPCM decoder 3 carries out a decoding process. PCM code 105 output from ADPCM decoder 3 is selected by reconstructed output switch 5 to be provided to fade out processor 7. When error detection information 102 attains an error nondetected state, fade out processor 7 is inactive. The applied PCM code 107 is intactly output as PCM code 108. Therefore, a reproduced voice is obtained according to a PCM code generated by ADPCM decoder 3 when no error is detected.

At the transition of the error detection information 102 to an error detected state from an error nondetected state at time t1, ADPCM decoder 3 is inhibited of its decoding process. Memory circuit 4 is brought to a read out state from a write state. PCM code 106 read out from memory circuit 4 is provided to fade out processor 7 via reconstructed output switch 5. Fade out processor 7 is activated according to an error detected state designation of error detection information 102 to gradually attenuate PCM code 107 (PCM code 106 output from memory circuit 4) from reconstructed output switch 5. The amplitude of the reconstructed wave form of PCM code 108 is attenuated gradually by the attenuation process of fade out processor 7. Therefore, a muted state of a DC bias smaller than the DC value according to PCM code 106 read out from memory circuit 4 is attained. A muted state can be maintained more stably. By gradually attenuating the amplitude of PCM code 108 by fade out processor 7, noise generated in the case of a rapid attenuation can be suppressed. The noise generated at the transition of error detection information 102 from an error nondetected state to an error detected state can be suppressed to maintain a muted state stably.

Figure 13:
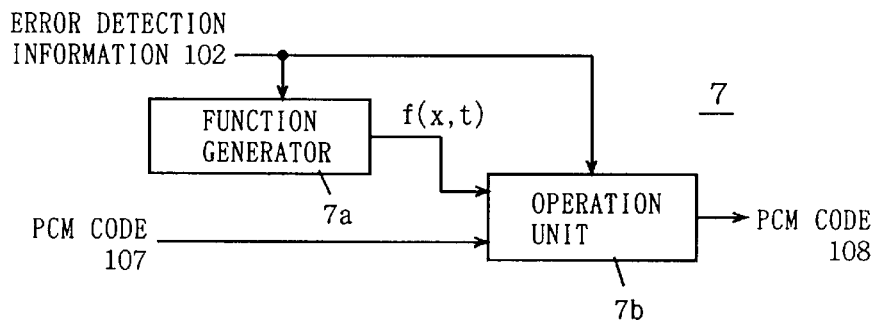
FIG. 13 schematically shows a structure of a fade out processor of FIG. 11.

FIG. 13 schematically shows a structure of a fade out processor 7 of FIG. 11. Referring to FIG. 13, fade out processor 7 includes a function generator 7a activated at an error detected state designation of error detection information 102 for generating a predetermined attenuation function f(x, t), an operation unit 7b activated at an error detected state designation of error detection information 102 for applying function f(x, t) from function generator 7a on PCM code 107 for generating PCM code 108. Operation unit 7b functions as a transfer gate to simply pass an applied PCM code 107 when error detection information 102 indicates an error nondetected state.

In attenuation function f(x, t) generated from function generator 7a, t indicates time and x indicates an input PCM code.

Figure 14:
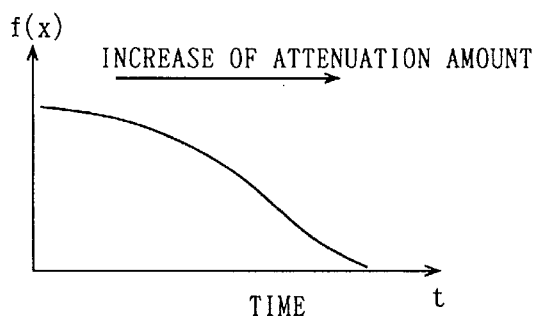
FIG. 14 shows an example of a function generated by a function generator of FIG. 13.
Figure 15:
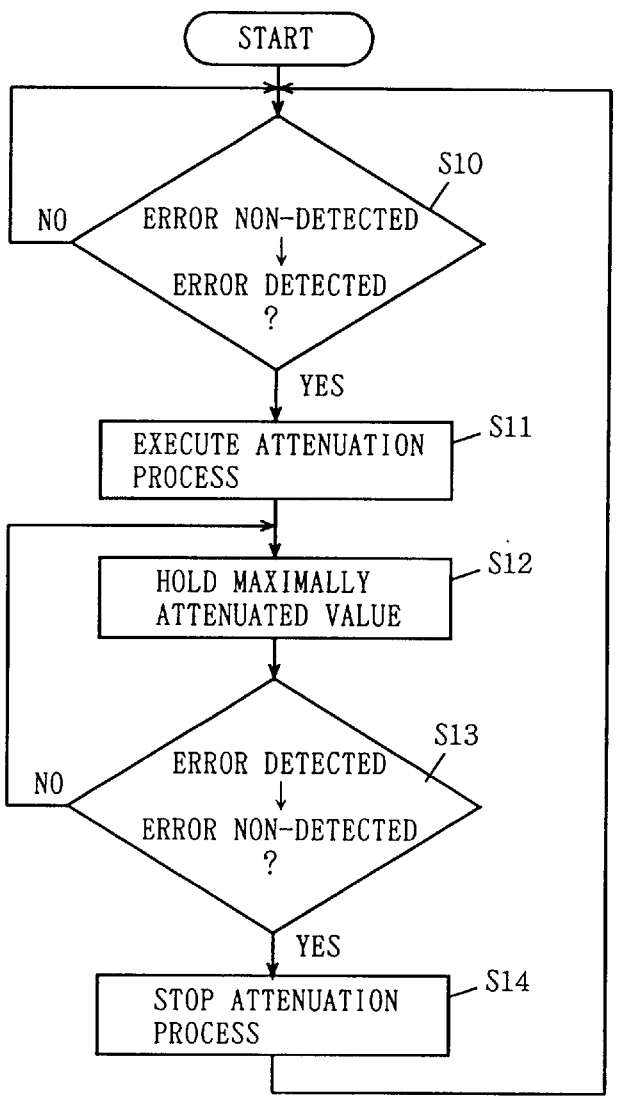
FIG. 15 is a flow chart representing an operation of the fade out processor of FIG. 13.

FIG. 14 shows one form of attenuation function f(x, t) output from function generator 7a. In FIG. 14, the change f(x) over time t of attenuation function f(x, t) is indicated. It is appreciated that attenuation function f(x, t) has the attenuation level for input value x increased with time t. One example of such an attenuation function f(x, t) is function, $2^{-t} \cdot x$. The operation of fade out processor 7 of FIG. 13 will now be described with reference to the flow chart of FIG. 15.

Determination is made on whether error detection information 102 makes transition to an error detected state from an error nondetected state (step S10). This step S10 is repeatedly executed while error detection information 102 maintains an error nondetected state designation. When error detection information 102 makes a transition from an error nondetected state designation to an error detected state, function generator 7a and operation unit 7b are activated, whereby an attenuation process is carried out (step S11). In this attenuation process, function generator 7a generates and provides to operation unit 7b an attenuation function f(x, t). Operation unit 7b processes an input PCM code 107 according to function f(x, t) applied from function generator 7a. The processed function value is quantized with a quantization width identical to that of input PCM code 107. The quantized value is then coded into PCM code 108 to be output. When a predetermined maximum-attenuation value is reached in operation unit 7b, the value processed by that maximum attenuation value is output continuously (step S12). This maximum attenuation value may be a value for a 0 amplitude value, or a finite amplitude value of output PCM code 108. The operation process can be inhibited at this state, so that the output value is maintained and continuously output. In this state, the read out operation of memory circuit 4 is inhibited.

Under the above-described condition, determination is made whether error detection information 102 makes a transition from an error detected state to an error nondetected state. When error detection information 102 maintains an error detected state, operation unit 7b continuously outputs the maximum attenuation value. When error detection information 102 changes from an error detected state to an error nondetected state, operation unit 7b is inhibited of its attenuation operation. Also, function generator 7a is inhibited of its function generation operation, if in an active state. As a result, operation unit 7b functions as a transfer gate that simply passes input PCM code 107 (step S14). Then, control returns to step S10 where error detection information 102 is monitored.

Fade out processor 7 can be implemented by hardware, or have the fade out process executed using a software.

According to the third embodiment of the present invention, a fade out process is carried out for the PCM code read out from the memory circuit when an error is detected. Therefore, muting can be applied on the reproduced voice reliably when an error is detected to suppress generation of noise in error detection.

Fourth Embodiment

Figure 16:
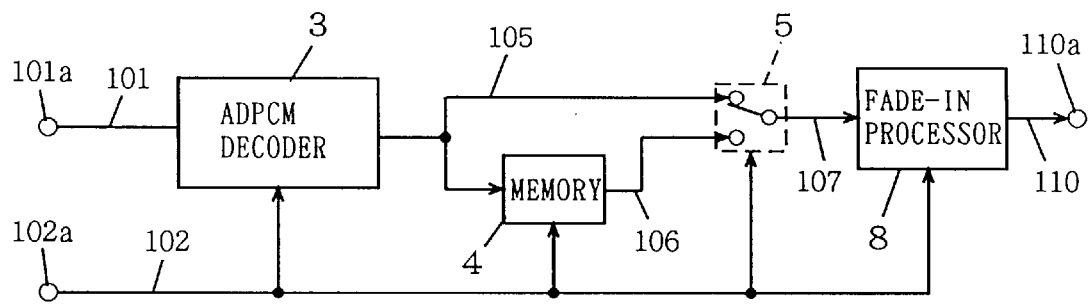
FIG. 16 schematically shows a structure of a reception data expander according to a fourth embodiment of the present invention.

FIG. 16 shows a structure of a reception data expander according to a fourth embodiment of the present invention. The reception data expander of the present embodiment differs from the reception data expander of the first embodiment shown in FIG. 1 in the following point.

In the fourth embodiment, a fade in processor 8 is provided which receives PCM code 107 output from reconstructed output switch 5, and is responsive to a transition of error detection information 102 to an error nondetected state from an error detected state for gradually amplifying the received PCM code 107 until the attenuation level is restored to an attenuation level of 0 from a predetermined attenuation level. PCM code 110 from fade in processor 8 is provided to the PCM decoder of the next stage via node 110a.

Figure 17:
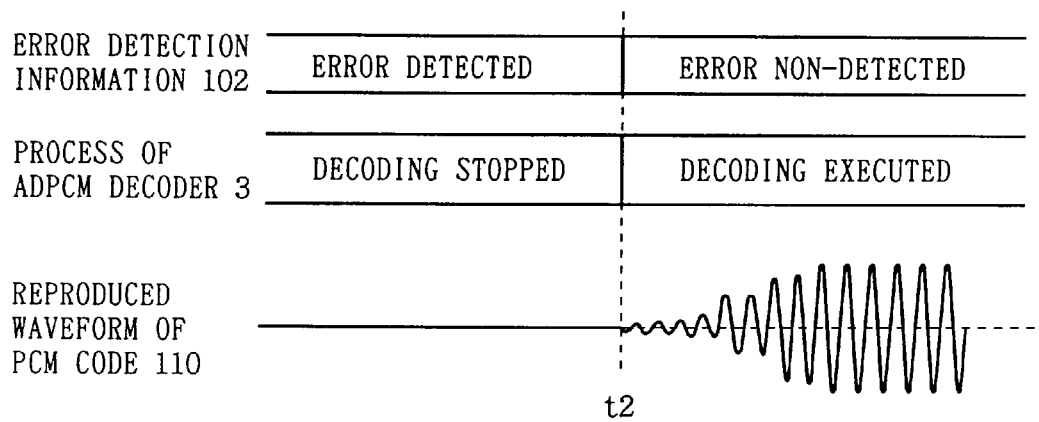
FIG. 17 shows an operation sequence of the reception data expander of FIG. 16.

The operation of the reception data expander of FIG. 16 will now be described with reference to the operation sequence of FIG. 17.

When error detection information 102 attains an error detected state, ADPCM decoder 3 has its decoding operation inhibited. Reconstructed output switch 5 selects PCM code 106 read out from memory circuit 4 to provide the same to fade in processor 8. When error detection information 102 attains an error detected state, fade in processor 8 passes PCM code 107 from reconstructed output switch 5 to provide that PCM code 107 to the PCM decoder of the next stage as PCM code 110. Although a PCM code having an amplitude value of 0 is shown in FIG. 17, any DC signal of a predetermined level can be used.

At time t2 when error detection information 102 makes a transition from an error detected state to an error nondetected state, fade in processor 8 is activated to initiate the operation of gradually reducing the attenuation level from a predetermined attenuation level to amplify PCM code 107 from reconstructed output switch 5. The reproduced wave form of PCM code 110 has its amplitude gradually increased with time. When this attenuation level arrives at 0 (or at an elapse of a predetermined time), fade in processor 8 inhibits the amplification operation on PCM code 107 from reconstructed output switch 5 to intactly pass the applied PCM code 107 and output the same as PCM code 110. In this error nondetected state, ADPCM decoder 3 carries out a decoding operation. Reconstructed output switch 5 selects PCM code 105 from ADPCM decoder 3 to provide the same to fade in processor 8. Even when there is discontinuity in the ADPCM codes at the transition from an error detected state to an error nondetected state, fade in processor 8 carries out an amplification operation on PCM code 107 applied at the maximum-attenuation level. Therefore, the amplitude of noise arising from discontinuity of the ADPCM codes is made small enough to suppress generation of noise occurring at the transition from an error detected state to an error nondetected state. Thus, degradation in the audio quality of the reproduced voice at recommencing a decoding operation of ADPCM decoder 3 can be reduced.

Figure 18:
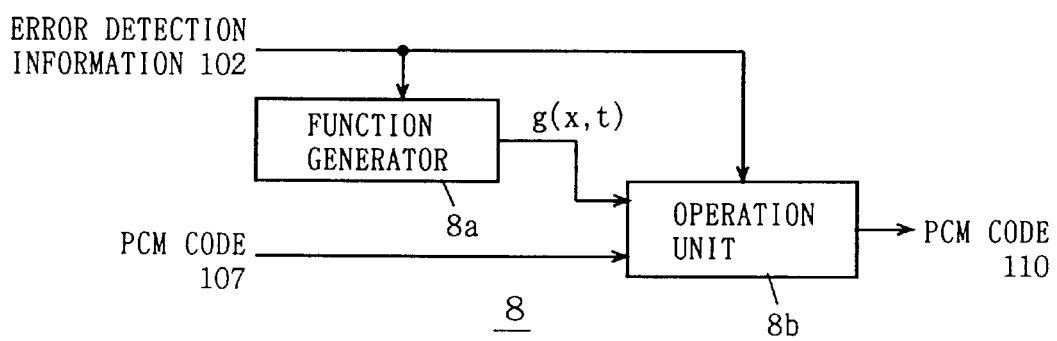
FIG. 18 schematically shows a structure of a fade in processor of FIG. 16.

FIG. 18 schematically shows a structure of fade in processor 8 of FIG. 16. Referring to FIG. 18, fade in processor 8 includes a function generator 8a activated for a predetermined time in response to transition of error detection information 102 from an error detected state to an error nondetected state to generate an amplification function g(x, t), and an operation unit 8b responsive to transition of error detection information 102 from an error detected state to an error nondetected state for applying function g(x, t) from function generator 8a on input PCM code 107 for generating PCM code 110. At an elapse of a predetermined time from the transition of error detection information 102 to an error nondetected state from an error detected state, or when function g(x, t) from function generator 8a arrives at an attenuation level of 0, operation unit 8b functions as a transfer gate to pass through PCM code 107 for generating PCM code 110.

Figure 19:
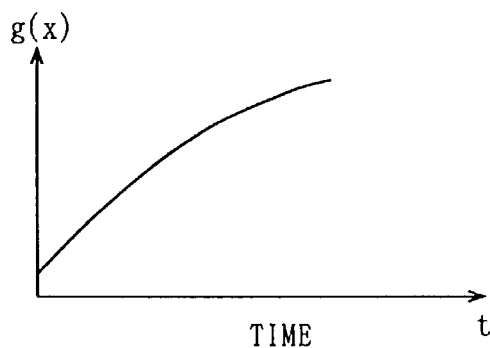
FIG. 19 shows an example of a function generated by the function generator of FIG. 18.
Figure 20:
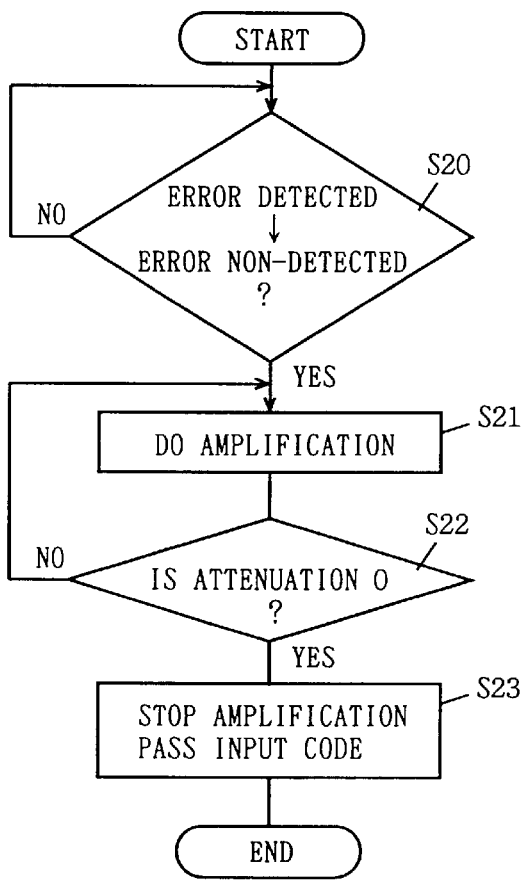
FIG. 20 is a flow chart representing an operation of the fade in processor of FIG. 18.

FIG. 19 shows one form of amplification function g(x, t) generated from function generator 8a. As shown in FIG. 19, function g(x, t) generated from function generator 8a has its attenuation level reduced with time t to eventually arrive at an attenuation level of 0. One example of function g(x) is $(1-2^{-r}) \cdot x$. The amplification operation of FIG. 18 will now be described with reference to the flow chart of FIG. 20.

The transition from an error detected state to an error nondetected state is monitored according to error detection information 102. When error detection information 102 is an error detected state, fade in process 8 is inactive, so that an amplification operation is not carried out. When error detection information 102 attains an error detected state at this time, fade in processor 8 can carry out an amplification operation at the maximum attenuation rate. At the transition of error detection information 102 from an error detected state to an error nondetected state, function generator 8a and operation unit 8b are activated. Operation unit 8b carries out an amplification process on input PCM code 107 according to function g(x, t) from function generator 8a (step S21). Operation unit 8b determines whether the attenuation level of function g(x, t) from function generator 8a has arrived at 0 (step S22). This determination can be carried out according to whether a predetermined time has elapsed or not from transition of error detection information 102 from an error detected state to an error nondetected state. The attenuation level of function g(x, t) generated from function generator 8a has only to be adapted to become 0 at the elapse of a predetermined time.

Operation unit 8b carries out an amplification operation (an attenuation operation where the attenuation rate is reduced) according to function g(x, t) until the attenuation level of function g(x, t) arrives at 0. When the attenuation level arrives at 0, operation unit 8b is inhibited of its amplification operation. Input PCM code 107 is passed to generate PCM code 110. As a result, the series of fade in process is completed.

In the fourth embodiment of the present invention, a fade in process is executed that carries out an amplification operation with a gradually reduced attenuation level over time in response to transition of error detection information from an error detected state to an error nondetected state. Therefore, generation of noise arising from discontinuity of an ADPCM code when a decode process is commenced can be suppressed.

Fifth Embodiment

Figure 21:
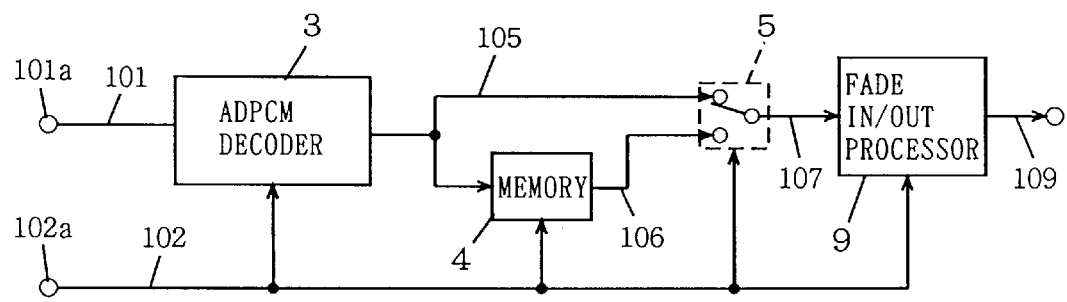
FIG. 21 schematically shows a structure of a reception data expander according to a fifth embodiment of the present invention.

FIG. 21 schematically shows a structure of a reception data expander according to a fifth embodiment of the present invention. The reception data expander of FIG. 21 differs from the reception data expander of FIG. 1 in the following point.

The reception data expander of FIG. 21 includes a fade in/out processor 9 receiving PCM code 107 from reconstructed output switch 5 to selectively carry out a fade in/fade out process according to error detection information 102. When error detection information 102 makes transition from an error nondetected state to an error detected state, fade in/out processor 9 carries out a fade out process on PCM code 107 from reconstructed output switch 5 to gradually reduce the amplitude of PCM code 109. When error detection information 102 attains an error detected state, fade in/out processor 9 holds PCM code 109 that is attenuated at the maximum-attenuation level. When error detection information 102 makes a transition from an error detected state to an error nondetected state, fade in/out processor 9 carries out a fade in process on PCM code 107 provided from reconstructed output switch 5. The operation of the reception data expander of FIG. 21 will now be described with reference to the operation sequence diagram of FIG. 22.

When error detection information 102 attains an error nondetected state, ADPCM decoder 3 generates PCM code 105 according to input ADPCM code 101. Reconstructed output switch 5 selects PCM code 105 to provide the same to fade in/out processor 9. Fade in/out processor 9 selects the PCM code from reconstructed output switch 5 to provide the same as PCM code 109 to the next PCM decoder of the next stage when error detection information 102 attains an error nondetected state (at an elapse of a processed time from the transition to error nondetected state).

At time t1 when error detection information 102 makes a transition from an error nondetected state to an error detected state, ADPCM decoder 3 stops its decoding operation. Reconstructed output switch 5 selects PCM code 106 from memory circuit 4 to provide the same as PCM code 107 to fade in/out processor 9. Fade in/out processor 9 carries out a fade out process similar to that of the third embodiment on input PCM code 107 according to the transition of error detection signal 102 from an error nondetected state to an error detected state. As a result, the reproduced wave form of PCM code 109 output from fade in/out processor 9 has its amplitude gradually reduced to be maintained at the current amplitude value when the maximum-attenuation level is reached.

Figure 22:
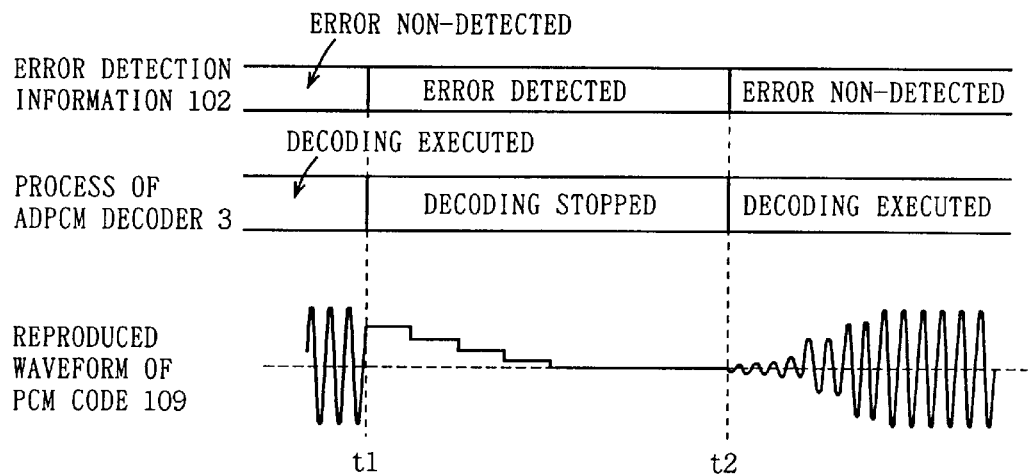
FIG. 22 shows an operation sequence of the reception data expander of FIG. 21.

In FIG. 22, a process where the amplitude value of PCM code 109 is reduced to the amplitude value of 0 in fade in/out processor 9 is shown. The magnitude of the PCM code at the maximum-attenuation level does not have to be 0, and can be a predetermined finite value.

When error detection information 102 makes a transition from an error detected state to an error nondetected state at time t2, fade in/out processor 9 carries out a fade in process on PCM code 107 from reconstructed output switch 5. Reconstructed output switch 5 selects PCM code 105 from ADPCM decoder 3 to provide the same to fade in/out processor 9 according to an error nondetected state of error detection information 102. The amplitude of the reproduced wave form of PCM code 109 from fade in/out processor 9 gradually increases according to decoded PCM code 105. Therefore, a fade in process is carried out at fade in/out processor 9 even when there is discontinuity in the ADPCM codes at the transition from an error detected state to an error nondetected state. The amplitude value of the wave form of the reproduced voice when there is discontinuity in the ADPCM codes is small, so that generation of noise arising from discontinuity can be suppressed. When this attenuation level of 0 is reached, fade in/out processor 9 is inhibited of its fade in process to transmit PCM code 107 from reconstructed output switch 5 as PCM code 109.

Figure 23:
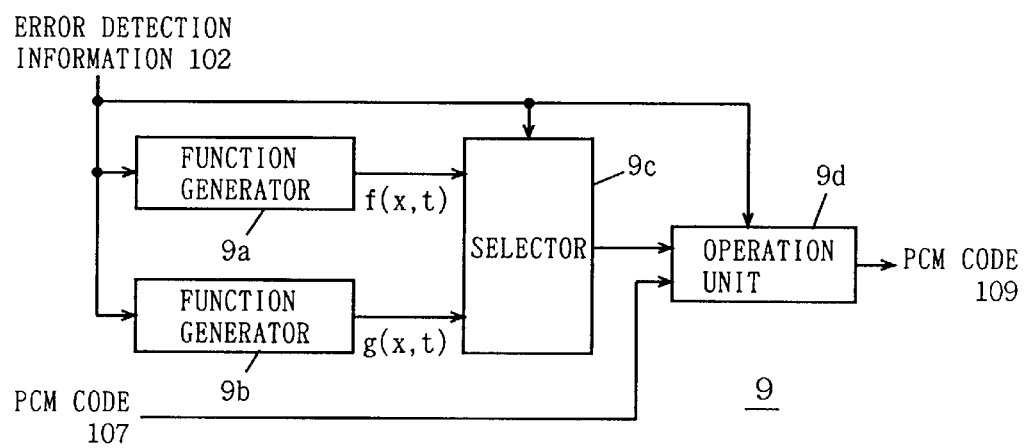
FIG. 23 schematically shows a structure of a fade in/out processor of FIG. 21.

FIG. 23 schematically shows a structure of fade in/out processor 9. Referring to FIG. 23, fade in/out processor 9 includes a function generator 9a activated at the transition of error detection information 102 to an error detected state to generate a predetermined attenuation function f(x, t), a function generator 9b activated at the transition of error detection information 102 from an error detected state to an error nondetected state to generate a predetermined amplification function g(x, t), a selector 9c for selecting and providing the function of either function generator 9a or 9b according to error detection information 102, and an operation unit 9d activated at the transition of error detection information 102 to an error detected state or to an error nondetected state from an error detected state to apply the function from selector 9c on input PCM code 107 for generating PCM code 109. The structure of fade in/out processor 9 of FIG. 23 is a combination of the structure shown in FIGS. 13 and 18. Therefore, the operation of the fade in/output processor 9 of FIG. 23 can be provided by a combination of the flows shown in FIGS. 15 and 20. More specifically, when error detection information 102 attains an error nondetected state, and at an elapse of a predetermined time from transition to an error nondetected state, fade in/output processor 9 functions as a transfer gate to pass input PCM code 107.

When error detection information 102 makes a transition from an error nondetected state to an error detected state, function generator 9a is activated. Selector 9c selects function f(x, t) from function generator 9a, which is provided to operation unit 9d. In response to transition of error detection information 102, operation unit 9d applies the function from selector 9c on input PCM code 107 to generate PCM code 109. As a result, the amplitude of the reproduced wave form of PCM code 109 is gradually reduced and maintained at the minimum amplitude value during an error frame period.

When error detection information 102 attains an error detected state, PCM code 109 attains the minimum amplitude.

At the transition of error detection information 102 from an error detected state to an error nondetected state function generator 9b is activated. Selector 9c selects this function g(x, t), which is provided to operation unit 9d. In response to transition of error detection information 102 to an error nondetected state, operation unit 9d applies the function from selector 9c on input PCM code 107 to generate PCM code 109. As a result, the amplitude of the reproduced wave form of PCM code 109 gradually increases. When the attenuation level of function g(x, t) from function generator 9g arrives at 0, or at an elapse of a predetermined time period from transition of error detection information 102 to an error nondetected state, operation unit 9d is inhibited of its amplification operation, and functions as a transfer gate. Input PCM code 107 is passed through to be generated as PCM code 109.

Fade in/out processor 9 of FIG. 23 can be implemented using a hardware. Alternatively, it can be realized by a DSP or by using a software.

According to the fifth embodiment of the present invention, a fade out process is carried out at the transition from an error nondetected state to an error detected state, and a fade in process is carried out from the fade out state at the transition from an error detected state to an error nondetected state to generate PCM code 109. Therefore, a fade in process can be reliably carried out at the transition of error detection information 102 from an error detected state to an error nondetected state. Generation of noise at the time of discontinuity of ADPCM codes can be reliably suppressed.

Sixth Embodiment

Figure 24:
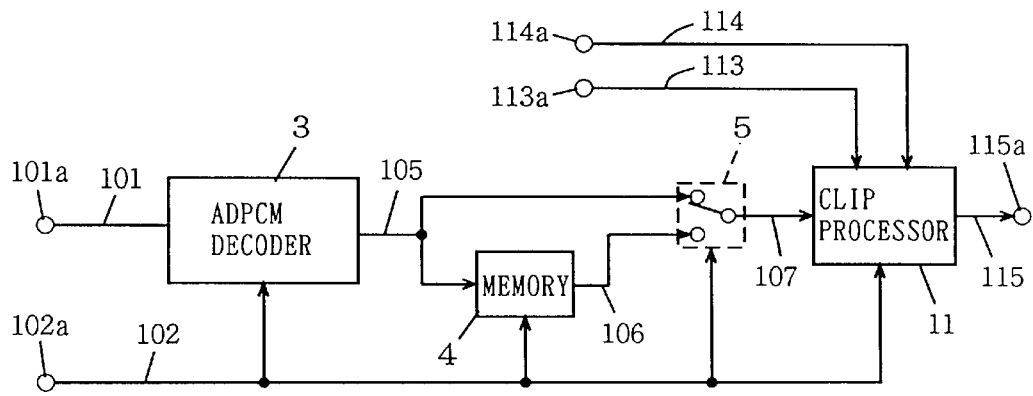
FIG. 24 schematically shows a structure of a reception data expander according to a sixth embodiment of the present invention.

FIG. 24 schematically shows a structure of a reception data expander according to a sixth embodiment of the present invention. The reception data expander of the present embodiment differs from the reception data expander of the first embodiment shown in FIG. 1 in the following point. The reception data expander of the sixth embodiment includes a clip processor 11 activated in response to a clip time set signal 113 applied from a node 113a at the transition of error detection information 102 from an error detected state to an error nondetected state to clip the amplitude of PCM code 107 provided from reconstructed output switch 5 with the clip value indicated by clip value signal 114 from a node 114a. A PCM code 115 is generated having its amplitude clipped at the clip value indicated by clip value signal 114 in clip processor 11. PCM code 115 is provided to the PCM decoder of the next stage via a node 115a.

Figure 25:
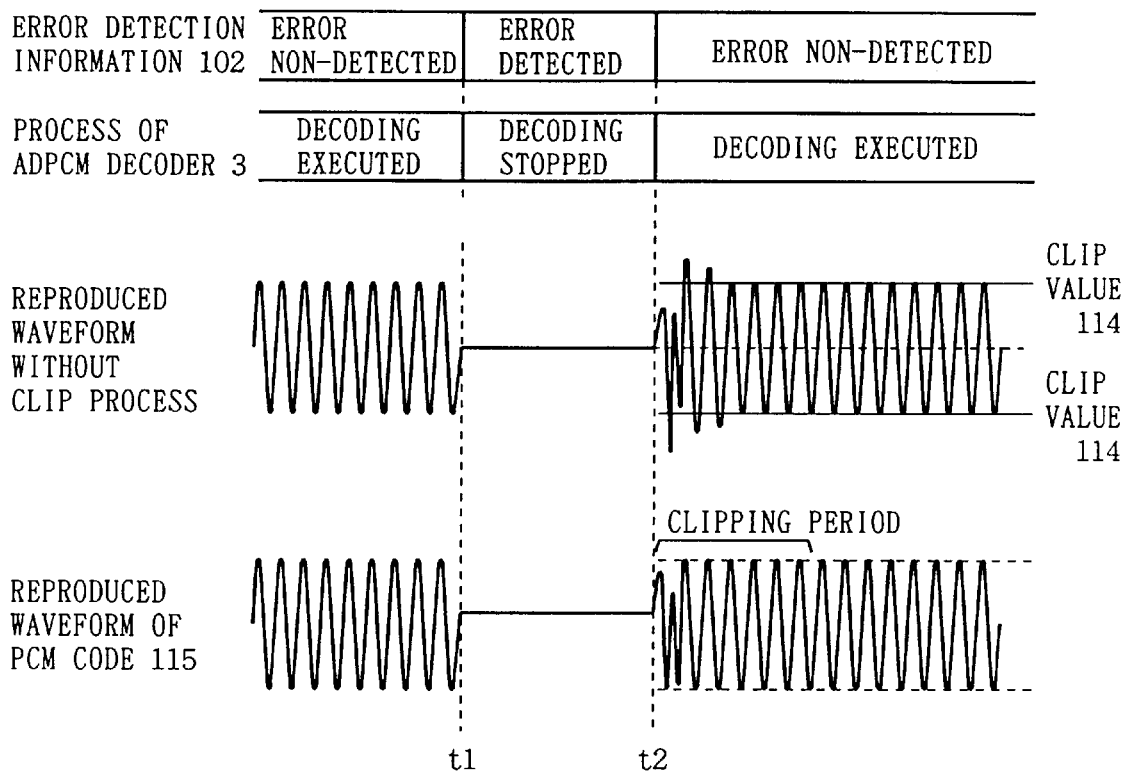
FIG. 25 shows an operation sequence of the reception data expander of FIG. 24.

The operation of the reception data expander of FIG. 24 will now be described with reference to the operation sequence of FIG. 25. When error detection information 102 attains an error nondetected state, ADPCM decoder 3 carries out a decoding process to generate PCM code 105. Reconstructed output switch 5 selects PCM code 105 from ADPCM decoder 3. The selected PCM code 105 is provided to clip processor 11 as PCM code 107. Since error detection information 102 is in an error nondetected state, clip processor 11 does not carry out a clip process, and passes the applied PCM code 107 to generate PCM code 115.

At the transition of error detection information 102 from an error nondetected state to an error detected state at time t1, ADPCM decoder 3 is inhibited of its decoding process. Reconstructed output switch 5 selects PCM code 106 read out from memory circuit 4, which is provided to clip processor 11. During this error detected time period, clip processor 11 does not carry out a clip process, and passes the applied input PCM code 107 to generate PCM code 115. In FIG. 25, the amplitude of PCM code 107 (PCM 115) at the time of error detection is shown being 0.

At the transition of error detection information 102 from an error detected state to a nondetected state at time t2, clip processing unit 11 is activated for a period set by clip time setting signal 113 to carry out a clip process. According to the transition to an error nondetected state, reconstructed output switch 5 selects PCM code 105 generated by ADPCM decoder 3 and provides the same as PCM code 107 to clip processor 11. Clip processor 11 compares the amplitude of the applied PCM code 107 with clip value signal 114. When the amplitude value of input PCM code 107 is greater than the value of clip value signal 114, the amplitude value of input PCM code 107 is substituted with the clip value indicated by the clip value signal 114. At the elapse of the time period set by clip length setting signal 113, clip processor 11 has its clip process inhibited. A clip process is not applied on input PCM code 107 which in turn is passed through to generate PCM code 115.

In the case where the amplitude value of PCM code 105 reconstructed by ADPCM decoder 3 is excessively increased due to discontinuity of ADPCM codes, 101 to become the source of noise generation, the execution of a clip process during a predetermined time period at the transition of error detection information 102 from an error detected state to an error nondetected state allows the great amplitude value of PCM code 105 to be restricted by a preset clip value signal 114 to suppress noise generation.

Figure 26:
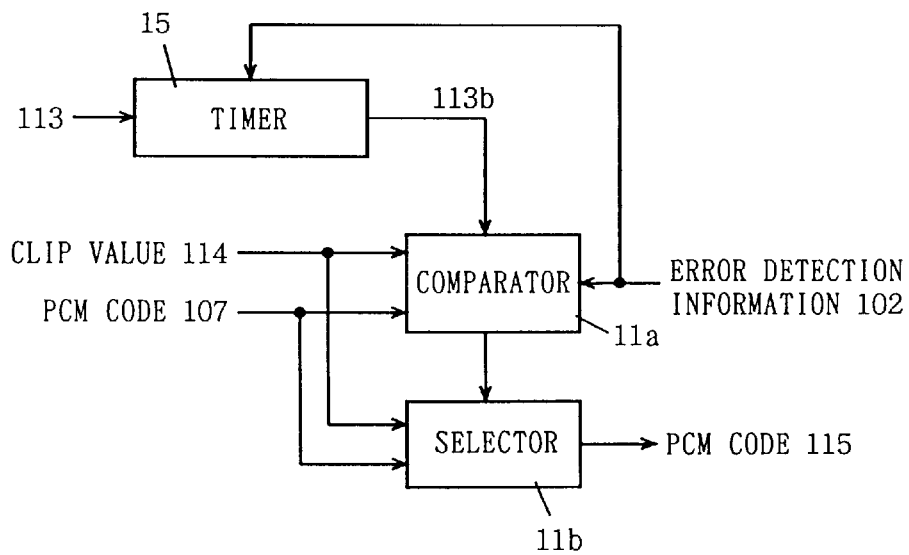
FIG. 26 schematically shows an example of a structure of a clip processor of FIG. 24.

FIG. 26 schematically shows a structure of clip processor 11 of FIG. 24. Referring to FIG. 26, clip processor 11 includes a timer 15 activated for a time period indicated by clip length setting signal 113 when error detection information 102 indicates an error nondetected state, a comparator 11a activated, when output signal 113b of timer 15 is active, to compare the amplitude values of clip value signal 114 and input PCM code 107, and a selector 11b for selectively passing either clip value signal 114 or PCM code 107 according to an output signal of comparator 11a. PCM code 115 is provided from selector 11b. Comparator 11a has selector 11b select PCM code 107 when error detection information 102 attains an error detected state, or when error detection information 102 attains an error nondetected state and output signal 113a from timer 15 is inactive. The operation of clip processor 11 of FIG. 26 will be described with reference to the flow chart of FIG. 27.

Determination is made on whether error detection information 102 makes the transition from an error detected state to an error nondetected state (step S30). Timer 15 is started when error detection information 102 attains an error nondetected state from an error detected state (step S31). Timer 15 is activated for a time indicated by clip length setting signal 113 to activate output signal 113b. Comparator 11a is rendered active to carry out a comparison operation according to an error nondetected state of error detection information 102 and to activation of output signal 113a of timer 15 (step S32). Comparator 11a compares the clip value indicated by clip value signal 114 with the amplitude of input PCM code 107 (step S33). When the clip value indicated by clip value signal 114 is greater than the amplitude of PCM code 107, selector 11b selects PCM code 107 to output the same as PCM code 115 according to an output signal of comparator 11a (step S34). When the clip value indicated by clip value signal 114 is not greater than the amplitude of PCM code 107, selector 11b substitutes the amplitude value of PCM code 107 with the clip value according to the output signal of comparator 11a. More specifically, the sign of input PCM code 107 is appended to the clip value indicated by clip value signal 114 for output (step S35).

Then, determination is made on whether output signal 113b from timer 15 is active or not (step S36). When clip length defining signal 113b from timer 15 is at an active state and indicates a clip term, step S32 is returned to carry out a comparison operation again. When clip length defining signal 113b output from timer 15 is rendered inactive, comparator 11a has its comparison operation inhibited. In response, selector 11b selects input PCM code 107 to provide the same as PCM code 115 (step S37). Then, the process returns to step S30 to prepare for the next process.

Thus, a clip process can be applied on the amplitude of an input PCM code 107 for a predetermined clip period at the transition of error detection information 102 to an error nondetected state from an error detected state. This process can be carried out using a hardware, or implemented in a software manner.

In the structure shown in FIG. 26, timer 15 is started according to error detection information 102. Clip length setting signal 113 may be a value indicating the number of samples (the number of input PCM codes) applied within the predetermined time period. In this case, in clip processor 11, a counter carries out a counting operation according to transition of error detection information 102 to an error nondetected state. The number of input PCM codes 107 is counted. The clip value is released when this count value becomes equals to the count value indicated by clip length setting signal 113. Such an implementation can be used in the present embodiment.

Thus, according to the sixth embodiment of the present invention, a structure is provided in which the amplitude value of an input PCM code is clipped by a predetermined clip value during a predetermined period at the transition of the error detection information from an error detected state to an error nondetected state. Therefore, reconstruction of a PCM code having an abnormal amplitude with the high probability of generating noise due to discontinuity of the ADPCM code at recommencing an ADPCM decoding process can be suppressed. Thus, noise generation is suppressed.

Seventh Embodiment

Figure 28:
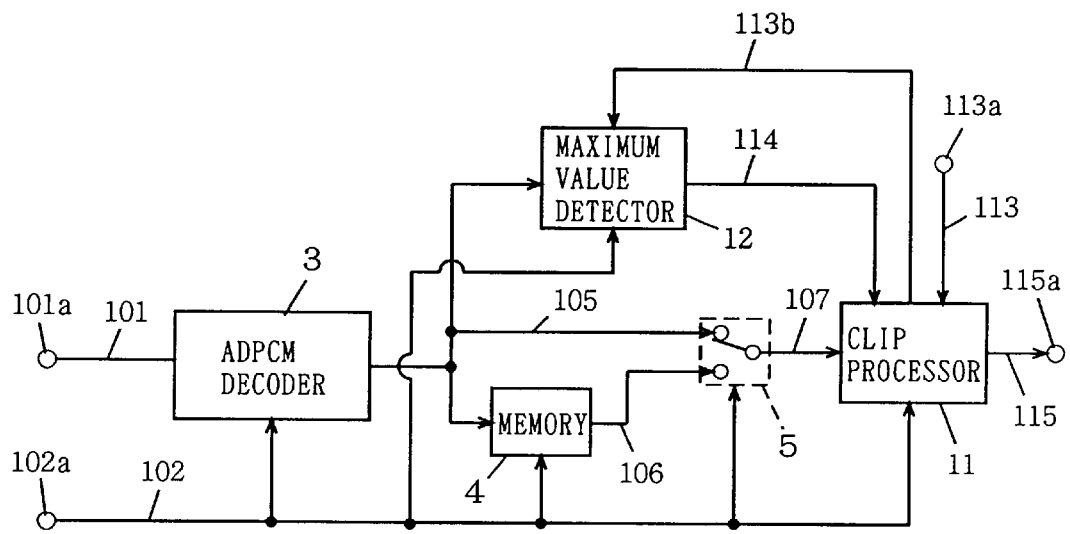
FIG. 28 schematically shows a structure of a reception data expander according to a seventh embodiment of the present invention.

FIG. 28 schematically shows a structure of a reception data expander according to a seventh embodiment of the present invention. The reception data expander of FIG. 28 differs from the reception data expander of FIG. 24 in the following point. The reception data expander of the present embodiment includes a maximum value detection circuit 12 activated in response to an error nondetected state of error detection information 102 and a non-process designation of clip process designation 113b for detecting the maximum amplitude value of PCM code 105 within a predetermined period for each frame, and providing the held maximum amplitude value as clip value signal 114.

Figure 29:
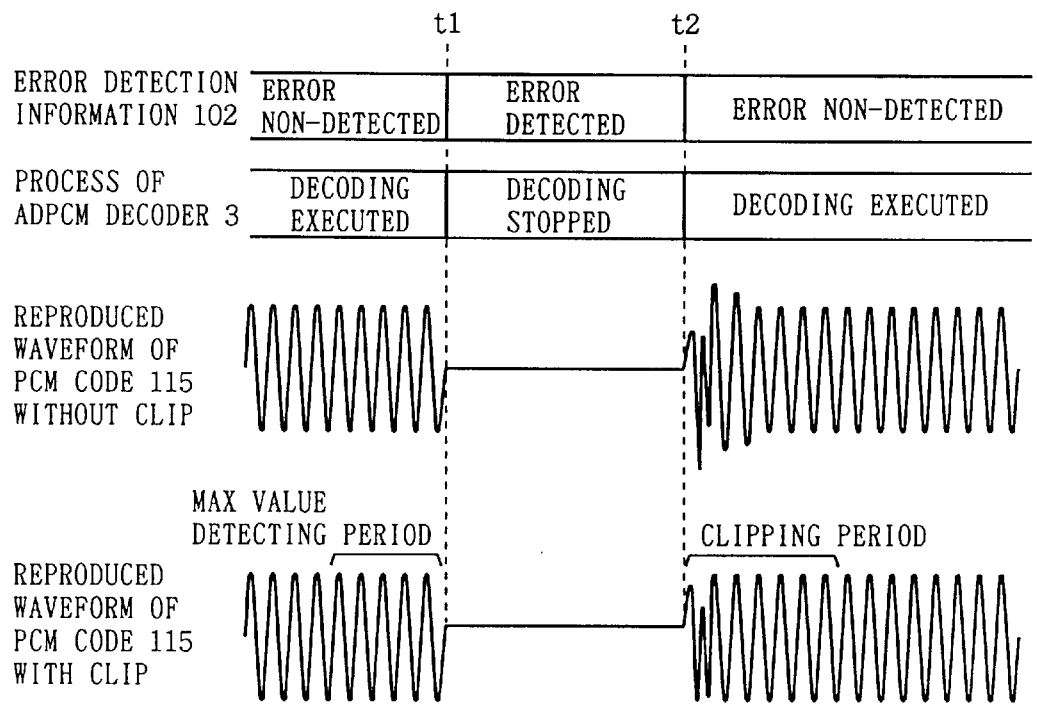
FIG. 29 shows an operation sequence of the reception data expander of FIG. 28.

When error detection information 102 attains an error detected state or during a clip process execution, maximum value detection circuit 12 has its maximum value detection operation inhibited to maintain the maximum amplitude value of PCM code 105 detected in the immediately preceding frame. Clip processor 11 is activated in response to transition of error detection information 102 from an error detected state to an error nondetected state to carry out a clip operation on PCM code 107 provided from reconstructed output switch 5 according to clip value signal 114 from maximum value detection circuit 114. The operation of the reception data expander of FIG. 28 will now be described with reference to the operation sequence diagram of FIG. 29.

When error detection information 102 attains an error nondetected state, ADPCM decoder 3 carries out a decoding operation, whereby ADPCM code 101 is expanded into PCM code 105. Maximum value detection circuit 12 detects the maximum amplitude value of PCM code 105 within a predetermined period in the frame for each frame according to an error nondetected state of error detection information 102. Maximum value detection circuit 12 has the detected maximum value updated every frame (when error detection information 102 is at an error nondetected state).

At time t1 when error detection information 102 makes a transition from an error nondetected state to an error detected state, ADPCM decoder 3 has its decoding operation inhibited. Reconstructed output switch 5 selects PCM code 106 read out from memory circuit 4 to provide the same to clip processor 11. Maximum value detection circuit 12 has its maximum value detection operation inhibited in response to transition of error detection information 102 to an error detected state, and maintains the maximum amplitude value detected at the prior frame. When error detection information 102 attains an error detected state, clip processor 11 does not carry out a clip process. Clip processor 11 passes PCM code 107 provided from reconstructed output switch 5 to output the same as PCM code 115. The PCM code corresponding to the last ADPCM code in this cycle is stored in memory circuit 4. Although the amplitude value of PCM code 106 may be finite, this amplitude value is illustrated being 0 in FIG. 29.

At time t2, when error detection information 102 makes transition from an error detected state to an error nondetected state, maximum value detection circuit 12 provides the held maximum amplitude value to clip processor 11 as clip value signal 114. Clip processor 11 carries out a clip process on the amplitude value of PCM code 107 from reconstructed output switch 5 according to clip value signal 114 for a predetermined time period according to clip length setting signal 113. The operation of maximum value detection circuit 12 is inhibited even during execution of this clip process. Although ADPCM decoder 3 is carrying out a decoding operation, the maximum amplitude value detected by maximum value detection circuit 12 is the maximum amplitude value of the PCM codes in a predetermined period in the frame just before error detection. Since the possibility of the voice wave forms in two continuous frames being approximating wave forms to each other is high, the maximum value of the PCM codes in the predetermined period in the previous frame is used as the clip value. Therefore, any reconstructed PCM code having an excessive great amplitude value due to discontinuity of the ADPCM codes in restarting a decoding process, which becomes the source of noise generation, can be reliably suppressed. Since the clip value of clip value signal 114 is updated every frame, a clip process can be carried out using an appropriate clip value for each frame in recommencing a decoding process.

Figure 30:
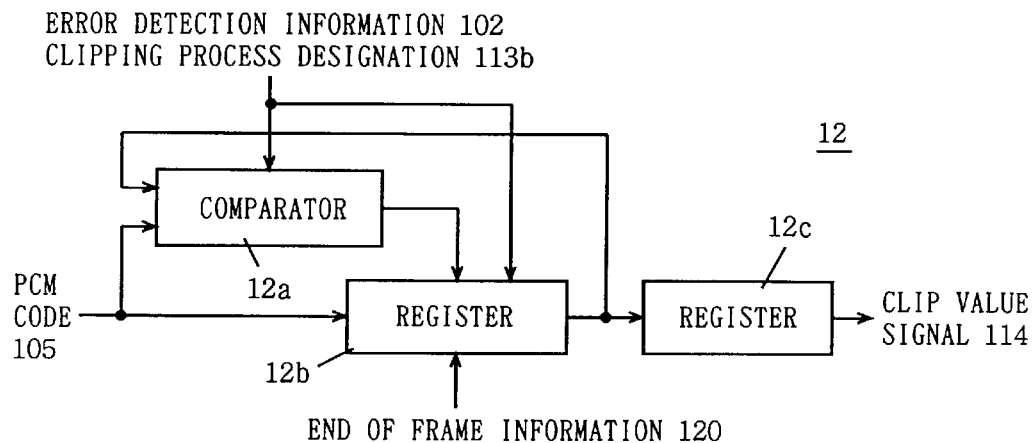
FIG. 30 schematically shows an example of a structure of a maximum value detection circuit of FIG. 28.
Figure 31:
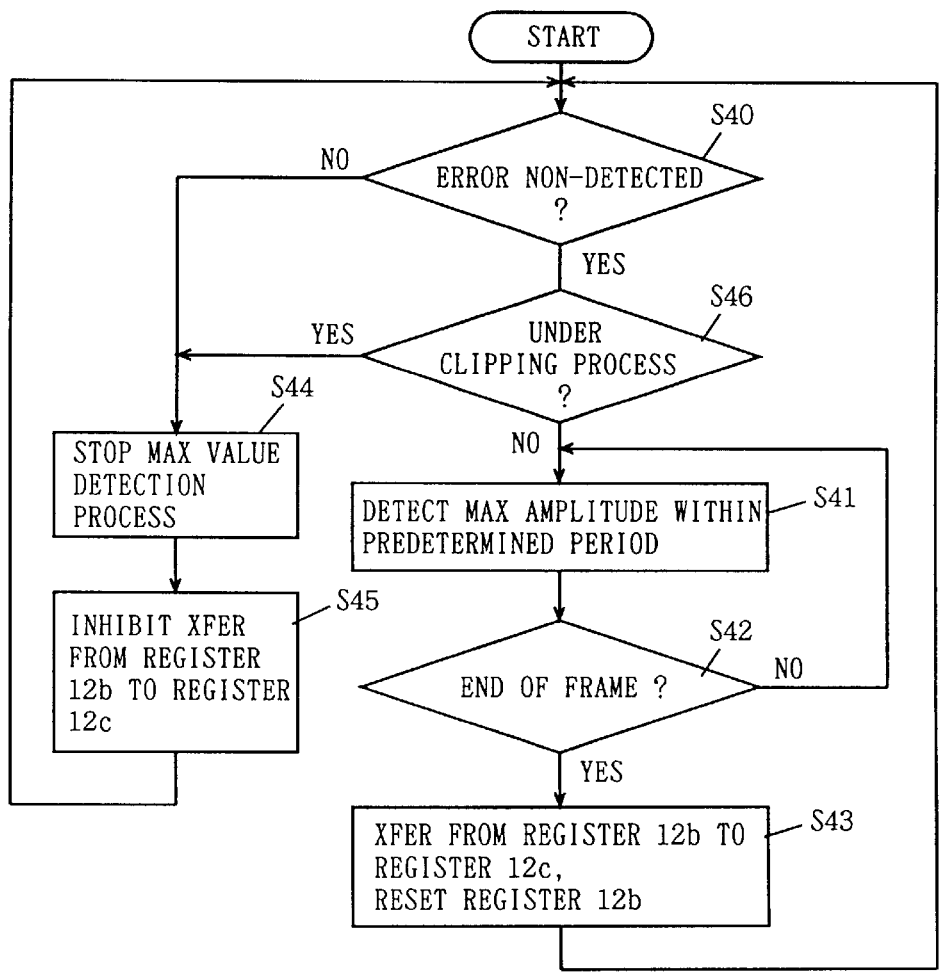
FIG. 31 is a flow chart showing an operation of the maximum value detection circuit of FIG. 30.

FIG. 30 schematically shows a structure of maximum value detection circuit 12 of FIG. 28. Referring to FIG. 30, maximum value detection circuit 12 includes a comparator 12a activated in response to an error nondetected state of error detection information 102 and a disabled clip process of clip process designation 113b for comparing the amplitudes of input PCM code 105 and the PCM code stored in register 12b. Register 12b has the stored content reset to the initial value in response to a frame end designation of frame end information 120. When the output signal from comparator 12a indicates that the amplitude value of input PCM code 105 is greater, register 12b stores input PCM code 105. Register 12b transfers the stored content to the next register 12b at the transition of error detection information 102 from error nondetected state to an error detected state. Clip value signal 114 is output from register 12c. The operation of maximum value detection circuit 12 of FIG. 30 will be described with reference to the flow chart of FIG. 31.

Determination is made on whether error detection information 102 attains an error nondetected state or not (step S40). Then, determination is made on whether during a clip processing period or not (step S46). When error detection information 102 attains an error nondetected state and when not during a clip processing period, comparator 12a is active. The maximum amplitude value of input PCM code 105 is detected in a predetermined period for each frame (step S41). The operation set forth in the following is carried out during this maximum amplitude value detection process.

Register 12b has its stored value reset to a predetermined initial value (for example, amplitude value 0) for each frame. Comparator 12a is activated for a predetermined period for each frame to compare the absolute value of input PCM code 105 with the value stored in register 12b. When the amplitude value (absolute value) of input PCM code 105 is smaller than the value stored in register 12b, register 12b does not have its stored content updated. When the amplitude value of input PCM code 105 is greater than the value stored in register 12b, register 12b stores the amplitude value of input PCM code 105 according to the output signal of comparator 12a. This process is carried out for input PCM codes 105 in a predetermined period. A structure in which comparator 12a is activated at an elapse of a predetermined time or at an elapse of a predetermined number of samples according to a signal indicating the beginning of each frame can be used for setting this predetermined time period. The beginning of a frame can be detected by a frame synchronization pattern. The end of a frame can be detected according to frame end (end of frame) information 120. There is a time difference between any adjacent frames. The end of a frame can be identified by detecting this time difference.

When frame end information 120 attains an inactive state, and does not indicate a frame end, the operation of detecting a frame end is repeated (step S42). When frame end information 120 indicates the end of a frame, the stored value in register 12b (maximum amplitude value in a predetermined time period) is transmitted to register 12c. The stored content of register 12b is reset to the initial value (step S43). Then, the process from step S40 is repeated again.

When error detection information 102 attains an error detected state at step S40, or when determination is made of in a clip period at step S46, the maximum value detection process is inhibited (step S44). More specifically, comparator 12a does not carry out a comparison operation, and register 12b does not have its stored content updated. When error detection information 102 attains an error detected state under this condition, data transfer from register 12b to register 12c is inhibited even when frame end information 120 indicates the end of a frame (step S45). At the transition of error detection information 102 to error nondetected state, the maximum amplitude value detection process at the predetermined period for each frame is carried out according to the process from step S41 again. In this case, register 12c maintains the maximum amplitude value in the predetermined period in the frame right before the error is detected. The held maximum amplitude value is output as clip value signal 114. In the first frame following the transition from an error detected state to an error nondetected state, clip processor 11 carries out a clip process on PCM code 107 using the stored data in register 12c as clip value signal 114.

Figure 27:
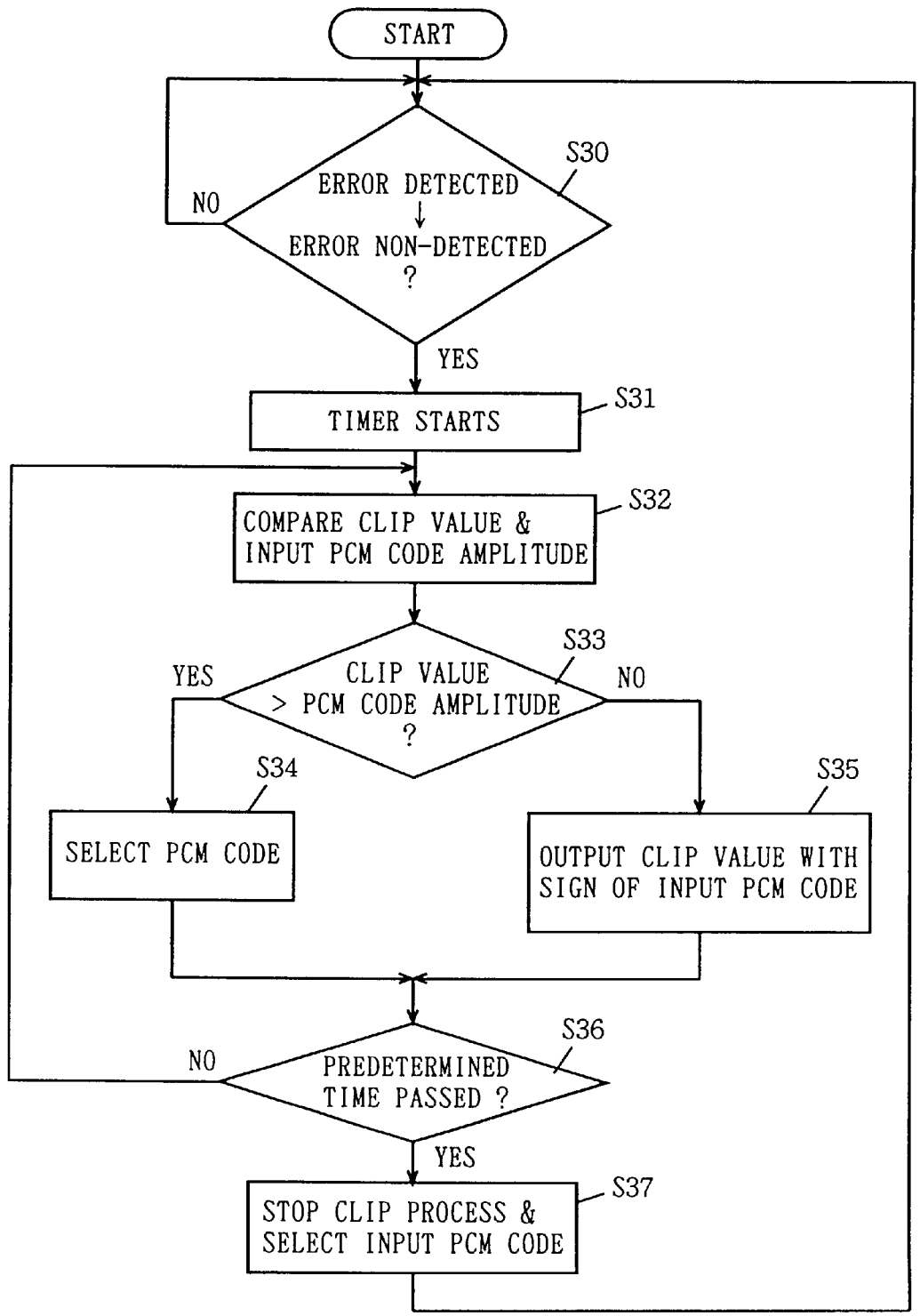
FIG. 27 is a flow chart representing an operation of the clip processor of FIG. 26.

The structure and operation of clip processor 11 are similar to those of the clip processor of FIG. 26 and FIG. 27. The only difference is that the applied clip value signal is altered according to an error detected frame.

According to the seventh embodiment of the present invention, the maximum amplitude value of a PCM code in a predetermined period is detected and held for each frame. At the transition from an error detected state to an error nondetected state, a clip process on the amplitude of the PCM code is carried out using the maximum amplitude value of the PCM code in the predetermined period of a frame immediately before error detection. Therefore, generation of a PCM code having an abnormal amplitude arising from discontinuity of the ADPCM codes encountered at the transition from an error detected state to an error nondetected state can be suppressed. Since the clip value is determined every error detected frame, a clip process can be carried out with the optimum clip value set. Degradation in the audio quality can be suppressed.

Eighth Embodiment

Figure 32:
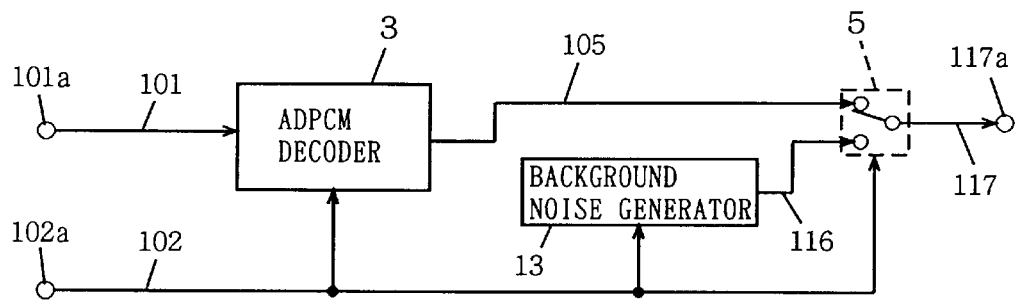
FIG. 32 schematically shows a structure of a reception data expander according to an eighth embodiment of the present invention.

FIG. 32 schematically shows a structure of a reception data expander according to an eighth embodiment of the present invention. Referring to FIG. 32, the reception data expander includes an ADPCM decoder 3 for expanding ADPCM code 101 applied via a node 101a coupled to a transmission path into PCM code 105, a background noise generator 13 activated in response to an error detected designation of error detection information 102 from node 102a to generate background noise 116, and a reconstructed output switch 5 for selecting either PCM code 105 from ADPCM decoder 3 or background noise 116 from background noise generator 13 according to error detection information 103 to provide the selected one as PCM code 117. PCM code 117 from reconstructed output switch 5 is applied to the next PCM decoder stage via node 117a.

Figure 33:
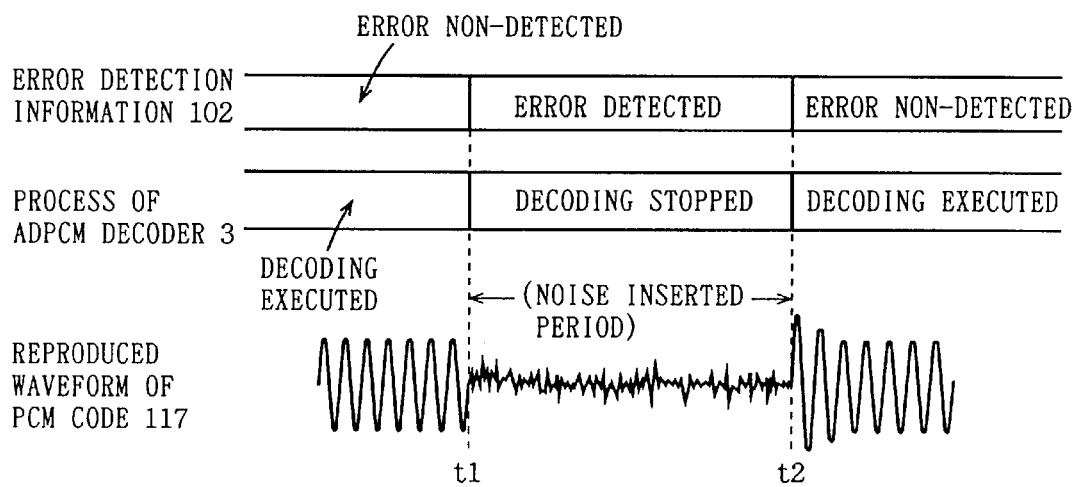
FIG. 33 shows an operation sequence of the reception data expander of FIG. 32.

Similar to the structure of the first to seventh embodiments, ADPCM decoder 3 has its decoding operation inhibited when error detection information 102 attains an error detected state. The operation of the reception data expander of FIG. 32 will be described with reference to the operation sequence diagram of FIG. 33.

When error detection information 102 attains an error nondetected state, ADPCM decoder 3 is active to expand ADPCM code 101 into PCM code 105. Reconstructed output switch 5 selects PCM code 105 from ADPCM decoder 3 to transmit the same as PCM code 117 via a node 117a. In this state, background noise generator 13 is inactive.

At time t1 when error detection information 102 makes transition to an error nondetected state to an error detected state, ADPCM decoder 3 is inhibited of its decoding process. Background noise generator 13 is activated in response to an error detected state designation of error detection information 102 to generate background noise 116. Reconstructed output switch 5 selects background noise 116 to provide the same as PCM code 117.

At time t2 when error detection information 102 makes transition from an error detected state to an error nondetected state, background noise generator 13 inhibits generation of background noise 116. ADPCM decoder 3 recommences a decoding operation to expand ADPCM code 101 into PCM code 105. Reconstructed output switch 5 selects and outputs PCM code 105 from ADPCM decoder 3.

By inhibiting the decoding process of ADPCM decoder 3 at error detection to generate background noise, the state where a received signal is completely muted can be avoided at error detection. Oddness in the reproduced voice can be reduced. Since ADPCM decoder 3 has its decoding process inhibited at error detection to maintain its internal state, discontinuity of the ADPCM codes occurs only at the transition of error detection information 102 from an error detected state to an error nondetected state. In this stage, background noise is inserted to reduce the effect of noise due to this discontinuity.

Figure 34:
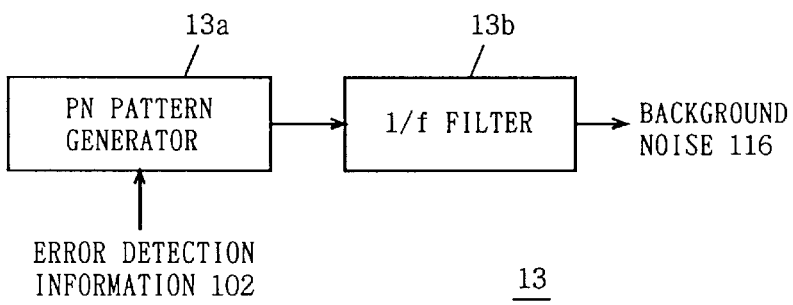
FIG. 34 schematically shows an example of a structure of a background noise generator of FIG. 32.
Figure 35:
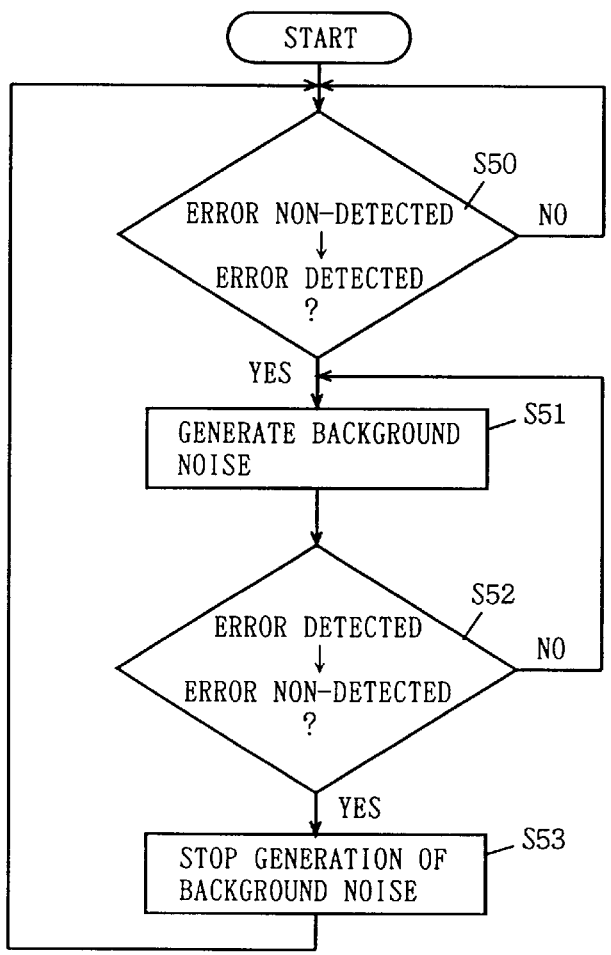
FIG. 35 shows a flow chart of an operation of the background noise generator of FIG. 34.

FIG. 34 shows an example of background noise generator 13 of FIG. 32. Referring to FIG. 34, background noise generator 13 includes a PN pattern generator 13a activated in response to an error detected state designation of error detection information 102 for generating a pseudo noise (PN) pattern, and a 1/f filter 13b for limiting the bandwidth of the PN pattern from PN pattern generator 13a. Background noise 116 is output from 1/f filter 13b. 1/f filter 13b reduces the passage level according to frequency fh. The operation of background noise generator 13 of FIG. 34 will be described with reference to the flow chart of FIG. 35.

Transition from an error nondetected state to an error detected state of error detection information 102 is monitored (step S50). When error detection information 102 attains an error nondetected state, background noise generator 13 does not operate and maintains an inactive state. At the transition of error detection information 102 from an error nondetected state to an error detected state, PN pattern generator 13a is activated to generate a PN pattern (step S51). The PN pattern from PN pattern generator 13a has its bandwidth restricted by 1/f filter 13b and output as background noise 116. Thus, generation of an unpleasant noise can be suppressed by limiting the bandwidth of 1/f filter 13b even when a PN pattern is generated.

Generation of background noise 116 is carried out when error detection information 102 attains an error detected state (S52). When determination of the transition of error detection information 102 to an error nondetected state is made at step S52, PN pattern generator 13a is rendered inactive to inhibit generation of background noise 116 (step S53). In an error nondetected state, voice is reproduced by PCM code 105 generated by ADPCM decoder 3.

The eighth embodiment of the present invention employs a structure where the process of the ADPCM decoder is inhibited and background noise is inserted when an error is detected. This prevents a received signal from attaining a completely muted state. Therefore, awkwardness in the reproduced voice can be alleviated.

In the above-described first to eighth embodiments, a structure of an ADPCM decoder is described. The present invention is applicable to any reception data expander of a type that expands a compressed code to generate an expansion code. In each structure, the various processes can be realized using a hardware, a software, or a digital signal processor.

Also, error detection information set forth in the following can be used. An error detection and correction code is included in a frame. When an error is detected, any correctable error is corrected. The error detection information is set to an error detected state only when there is an incorrectable error in the frame.

According to the present invention, a structure is provided to inhibit the process of a decoder when reception data error is generated to maintain the internal state. It is possible to improve noise suppression in transmission error without using a frame buffer. Since a frame buffer is not required, the hardware size can be reduced. Therefore, power consumption and device complexity can be reduced. When reception data error occurs continuously, only the process inhibiting time period of the decoder is increased. The discontinuous points of the codes is not increased. Therefore, the possibility of noise generation is not increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reception data expander comprising:
   an input node for inputting error detection information indicating whether there is an error in reception compression coded data that is compression-coded applied in frame unit via a transmission path,
   a decoder activated in response to an error nondetected designation of said error detection information from said input node for performing an expansion process on said reception compression coded data for generating expanded coded data,
   a memory circuit set to a write state in response to error nondetected designation of said error detection information for storing expanded coded data from said decoder, and set to a readout state in response to an error detected designation of said error detection information to output the stored expanded coded data, and
   a reconstructed output switch receiving expanded coded data read out from said memory circuit and expanded coded data from said decoder, responsive to an error nondetected designation of said error detection information for selecting and outputting expanded coded data from said decoder, and responsive to an error detected designation of said error detection information for selecting and outputting expanded coded data read out from said memory circuit.

2. The reception data expander according to claim 1, further comprising a transition detection circuit for detecting a transition of said error detection information from an error detected designation state to an error nondetected state,
   wherein said compression coded data is an ADPCM coded data,
   wherein said decoder comprises
      a quantization scale factor unit for generating a scale factor y using a high speed scale factor yu and a low speed scale factor yl to carry out an inverse adaptive quantization process on said ADPCM coded data, and
      a circuit responsive to a designation of the transition being detected from said transition detection circuit for substituting said high speed scale factor yu with yu $=_2{}^{-a} \cdot$ yl, using said low speed scale factor yl and a predetermined scaling factor $2^{-a}$ where a is a natural number within a range of $6 \leq a \leq 18$.

3. The reception data expander according to claim 2, wherein said a satisfies the relation of $6 \leq a \leq 10$.

4. The reception data expander according to claim 1, further comprising fade-out means activated in response to an error detected designation of said error detection information for reducing a level of expanded coded data from said reconstructed output switch with time for output.

5. The reception data expander according to claim 4, wherein said fade-out means includes means for stopping the reducing operation when an output thereof attains a predetermined attenuation amount and for maintaining the output thereof at the predetermined amount for outputting while said error detection information is in the error detected state.

6. The reception data expander according to claim 1, further comprising fade-in means receiving expanded coded data output from said reconstructed output switch, and activated in response to transition of said error detection information from an error detected designation to an error nondetected designation for amplifying data output from said reconstructed output switch according to an attenuation amount that decreases from an attenuation level of a predetermined value to an attenuation level of 0 with time and providing the amplified data.

7. The reception data expander according to claim 1, further comprising clipping means rendered active for a predetermined time in response to transition of said error detection information from an error detected designation to an error nondetected designation to compare an absolute value of expanded coded data output from said reconstructed output switch with a predetermined clip value, and substituting an amplitude value of a code indicated by the data output from said reconstructed output switch with said clip value when the comparison result indicates that the absolute value of said expanded coded data is greater than said clip value.

8. The reception data expander according to claim 7, further comprising max detecting means activated in response to an error nondetected designation of said error detection information for detecting a maximum amplitude value within a predetermined time of the expanded coded data output from said decoder to hold the detected maximum amplitude value at each predetermined time unit, and responsive to transition from an error detected state to an error nondetected state of said error detection information for providing the held maximum amplitude value as said clip value.

9. The reception data expander according to claim 8, wherein said max detecting means includes means for detecting said maximum amplitude value in each said frame.

10. The reception data expander according to claim 8, wherein said max detecting means includes means responsive to a designation of the clipping means being active for stopping the detecting operation.

11. A reception data expander device comprising:
    an input node for receiving error detection information indicating whether there is an error in compression coded data applied in a frame unit via a transmission path,
    a decoder activated in response to an error nondetected designation of said error detection information to perform an expansion process on compression-coded data applied via said transmission path to generate expansion coded data, background noise generator for generating a background noise, reconstructed output switch receiving said background noise from said background noise generator and expansion coded data from said decoder, for selectively selecting and outputting said background noise in response to an error detected designation of said error detection information, and expansion coded data output from said decoder in response to an error nondetected designation of said error detection information.

12. A reception data expander comprising:

an input node for receiving and applying error detection information indicating whether there is an error in an ADPCM coded data in each frame in a frame unit for ADPCM coded data transmitted in the frame unit via a transmission path, an ADPCM decoder receiving ADPCM coded data provided via said transmission path, activated when said error detection information attains an error nondetected designation state for performing an expansion process on said applied ADPCM coded data to generate PCM coded data, and having its expansion process operation inhibited when said error detection information attains an error detected designation state, a noise suppression data generator for generating noise suppression data for suppressing noise due to discontinuity of PCM codes output from said ADPCM decoder at transition of said error detection information, and a reconstructed output switch coupled to said ADCPM decoder and said noise suppression data generator, for selecting and outputting noise suppression data from said noise suppression data generator in response to an error detected designation of said error detection information, and for selecting and outputting a PCM code from said ADCPM decoder in response to an error nondetected designation state of said error detection information.

* * * * *